United States Patent
Ozaki et al.

(10) Patent No.: US 6,172,727 B1
(45) Date of Patent: *Jan. 9, 2001

(54) LIQUID CRYSTAL CELL HAVING ALIGNMENT FILMS RUBBED WITH DIFFERING RUBBING DENSITIES

(75) Inventors: Masaaki Ozaki; Tetsuya Sano, both of Kariya; Takayuki Fujikawa, Okazaki; Norio Yamamoto, Kariya, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/050,365

(22) Filed: Mar. 31, 1998

(30) Foreign Application Priority Data

Mar. 31, 1997 (JP) .................................... 9-080693
Jan. 29, 1998 (JP) .................................. 10-017444

(51) Int. Cl.$^7$ ...................... G02F 1/1337; G02F 1/141; C09K 19/02
(52) U.S. Cl. ...................... 349/128; 349/123; 349/133; 349/172; 349/174
(58) Field of Search .................... 349/123, 133, 349/172, 174, 128

(56) References Cited

U.S. PATENT DOCUMENTS

| | | | |
|---|---|---|---|
| 5,315,421 | * 5/1994 | Kurai et al. | 359/76 |
| 5,477,359 | * 12/1995 | Okazaki | 359/77 |
| 5,576,864 | * 11/1996 | Takao et al. | 359/76 |
| 5,631,752 | * 5/1997 | Tanaka | 349/173 |
| 5,700,392 | * 12/1997 | Kikuchi et al. | 252/299.01 |
| 5,705,094 | * 1/1998 | Takeuchi et al. | 252/299.01 |
| 5,719,653 | * 2/1998 | Minato | 349/156 |
| 5,747,122 | * 5/1998 | Yamamoto et al. | 428/1 |
| 5,764,328 | * 6/1998 | Kawada et al. | 349/174 |
| 5,786,879 | * 7/1998 | Kodera et al. | 349/134 |
| 5,820,782 | * 10/1998 | Yamada et al. | 252/299.61 |
| 5,838,293 | * 11/1998 | Kondoh | 345/97 |
| 5,886,755 | * 3/1999 | Imoto et al. | 349/174 |
| 5,897,189 | * 4/1999 | Sako et al. | 349/174 |
| 5,940,157 | * 8/1999 | Nakamura et al. | 349/174 |
| 5,999,241 | * 12/1999 | Nishi et al. | 349/126 |

FOREIGN PATENT DOCUMENTS 07-020474 1/1995 (JP) .
9-203901 8/1997 (JP) .

OTHER PUBLICATIONS

Nakayama et al, "Layer Rotation in Antiferroelectric Liquid Crystal by Applying Electric Field", Abstract document in 20th Liquid Crystal Forum, pp. 106–107, Oct. 1–3, 1994 at Nagoya University.*

(List continued on next page.)

* cited by examiner

Primary Examiner—William L. Sikes
Assistant Examiner—Taifur R. Chowdhury
(74) Attorney, Agent, or Firm—Pillsbury Madison & Sutro LLP

(57) ABSTRACT

The present invention relates to a structure of a liquid crystal (LC) cell using an antiferroelectric liquid crystal. The LC cell includes: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; and the electrode substrate with color filters and the opposite electrode substrate being superimposed so as to face each other through the first alignment film, the antiferroelectric liquid crystal, and the second alignment film. In the present invention, an alignment process of the first alignment film is performed based on a rubbing density larger than the rubbing density of the second alignment film so that an angle of layer rotation of the antiferroelectric liquid crystal is defined within a predetermined allowable angle range.

22 Claims, 18 Drawing Sheets

OTHER PUBLICATIONS

Chardani et al., "Tristable Switching in Surface Stablized Ferroelectronic...Polarization", Japanese Journal of Applied Physics, May 1988, vol. 27, No. 5, pp. L729–L732.

Meyer, "Ferroelectronic Liquid Crystals, A Review", Mol. Cyyst. Liq. Cryst., 1997, vol. 40, pp. 33–48.

Ozaki et al., Smectic Layer Rotation in Antiferroelectronic Liquid Crystal, Jpn. J. Appl. Phys., 1994, vol. 33, pp. L1620–L1623.

Fujikawa et al., Abstract document in 21st Liquid Crystal Forum, pp. 88–89.

Fujikawa et al., A Layer Rotation of Antiferroelectronic Liquid Crystal in A Rubbing Cell, detailed document in the 21st Liquid Crystal Forum.

Nishino et al., "Analysis of Abnormal Alignment by Optical Methods", Abstract document in 17th Liquid Crystal Forum, pp. 32–33.

Nakauama et al., "Layer Rotation in Antiferroelectronic Liquid Crystal by Applying Electric Field" Abstract document in 20th Liquid Crystal Forum, pp. 106–107.

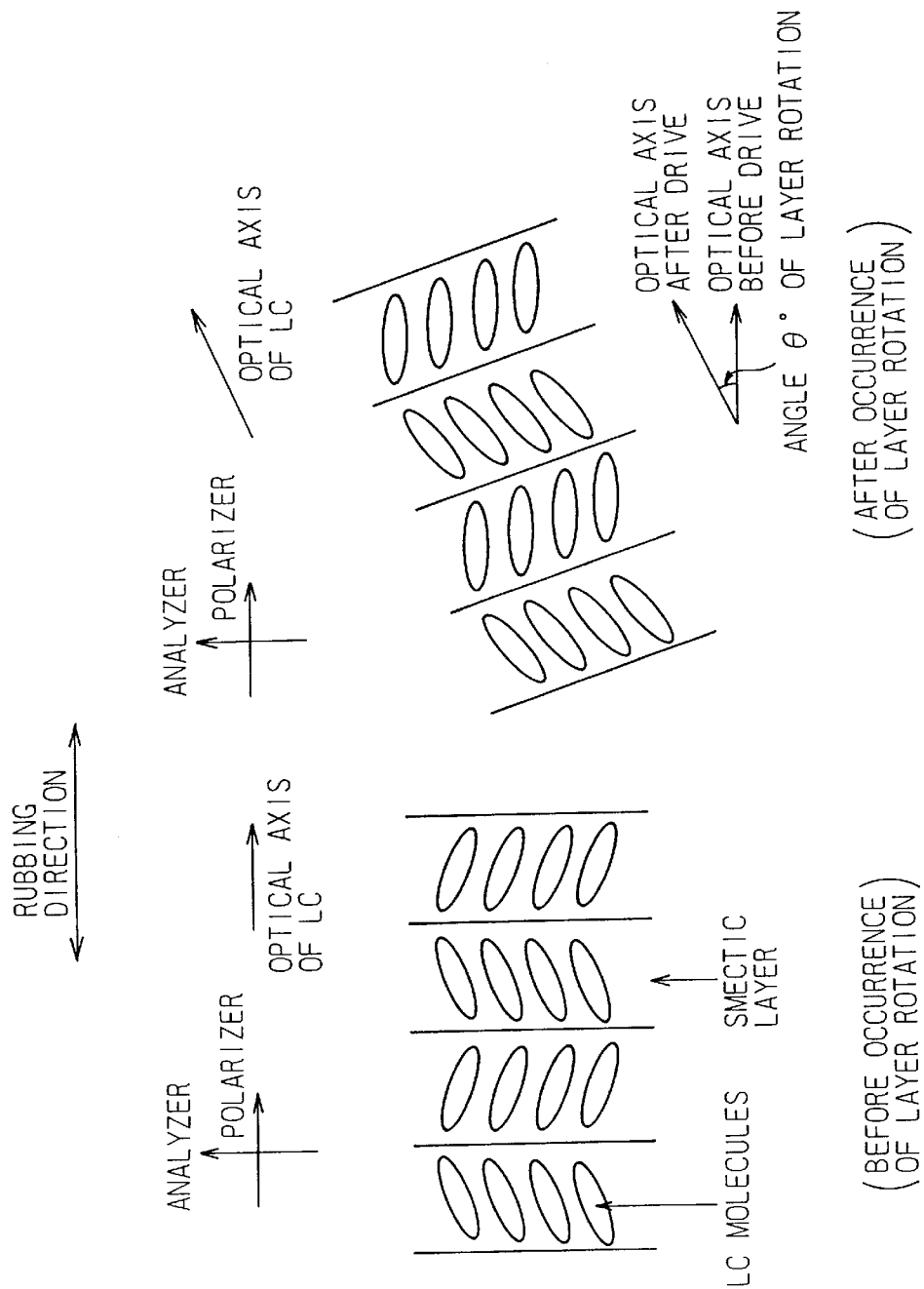

Fig.8

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| A11 | 28.0 | 15.3 | 12.7 | 0.60 | 1.5 |
| A12 | 22.7 | 11.6 | 11.1 | 0.65 | 2.1 |
| A13 | 21.3 | 19.8 | 1.5 | 0.04 | 0.5 |
| A14 | 17.2 | 28.9 | −11.7 | 0.51 | 1.3 |
| A15 | 17.8 | 22.7 | −4.9 | −0.24 | −0.7 |
| A16 | 18.5 | 21.8 | −3.3 | −0.16 | −0.8 |
| A17 | 15.7 | 26.4 | −10.7 | −0.51 | −1.8 |
| A18 | 18.3 | 23.5 | −5.2 | −0.25 | −0.7 |

Fig.9

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| B11 | 23.8 | 8.6 | 15.2 | 0.94 | 4.1 |
| B12 | 35.1 | 9.4 | 25.7 | 1.16 | 4.4 |
| B13 | 41.5 | 8.4 | 33.1 | 1.33 | 6.7 |
| B14 | 31.8 | 13.0 | 18.8 | 0.84 | 3.3 |

Fig.10

| CELL No. | $t_d^+$ (ms) | $t_d^-$ (ms) | $\Delta t_d$ (ms) | $\Delta t_d / t_{dav}$ | $\theta°$ |
|---|---|---|---|---|---|
| C11 | 8.9 | 24.0 | −15.1 | −0.92 | −2.4 |
| C12 | 7.3 | 35.6 | −28.3 | −1.32 | −2.7 |
| C13 | 3.4 | 61.0 | −57.6 | −1.79 | −4.8 |
| C14 | 6.9 | 43.0 | −36.1 | −1.45 | −3.0 |

Fig.13

| CELL No. | | DEP-AMT (mm) | ROT-SPD (r.p.m) | NUM-OF-RUB | ΔD OF Δnd (nm) | RES-TIME td⁺(ms) | td⁻(ms) | Δtd (ms) OF "td" | RUB-DEN | θ° |
|---|---|---|---|---|---|---|---|---|---|---|
| E11 | ERD 10 | 0.35 | 1000 | 3 | −0.3 | 10.2 | 34.1 | −23.9 | 12.4 r | −5 |
| | OPP-ERD 20 | 0.35 | 1000 | 3 | | | | | 12.4 r | |
| E12 | ERD 10 | 0.5 | 500 | 3 | −0.32 | 7.6 | 39.3 | −31.7 | 17.8 r | −6.2 |
| | OPP-ERD 20 | 0.5 | 500 | 3 | | | | | 17.8 r | |
| E13 | ERD 10 | 0.35 | 1000 | 6 | 0.03 | 21.0 | 19.5 | 1.5 | 24.9 r | 0.4 |
| | OPP-ERD 20 | 0.35 | 1000 | 3 | | | | | 12.4 r | |
| E14 | ERD 10 | 0.35 | 1000 | 3 | −0.07 | 19.2 | 22.7 | −3.5 | 12.4 r | −0.8 |
| | OPP-ERD 20 | 0.5 | 500 | 3 | | | | | 6.3 r | |
| E15 | ERD 10 | 0.5 | 1000 | 3 | −0.1 | 17.8 | 21.9 | −4.1 | 17.8 r | −1.0 |
| | OPP-ERD 20 | 0.35 | 1000 | 3 | | | | | 12.4 r | |
| E16 | ERD 10 | 0.35 | 1000 | 6 | −0.53 | 5.1 | 67.2 | −62.1 | 12.4 r | −1.1 |
| | OPP-ERD 20 | 0.35 | 1000 | 3 | | | | | 24.9 r | |
| E17 | ERD 10 | 0.35 | 500 | 3 | −0.51 | 4.5 | 64.8 | −60.3 | 6.3 r | −1.0 |
| | OPP-ERD 20 | 0.35 | 1000 | 3 | | | | | 12.4 r | |

Fig.14

| CELL No. | DEPRESSED AMOUNT (mm) | | UPPER $\Delta nd1$ (nm) | LOWER $\Delta nd2$ (nm) | $\Delta nd2 - \Delta nd1 = \Delta D$ (nm) | $\theta°$ |
|---|---|---|---|---|---|---|
| | UPPER | LOWER | | | | |
| D11 | 0.3 | 0.5 | 0.25 | 0.35 | 0.1 | 0.8 |
| D12 | 0.3 | 0.5 | 0.26 | 0.44 | 0.18 | 1.1 |
| D13 | 0.3 | 0.5 | 0.25 | 0.45 | 0.2 | 2.1 |
| D14 | 0.3 | 0.5 | 0.23 | 0.57 | 0.34 | 7.2 |
| D15 | 0.3 | 0.5 | 0.28 | 0.42 | 0.14 | 3 |
| D16 | 0.3 | 0.5 | 0.25 | 0.51 | 0.26 | 2.6 |
| D17 | 0.3 | 0.3 | 0.35 | 0.2 | −0.15 | −4 |
| D18 | 0.3 | 0.3 | 0.3 | 0.31 | 0.01 | 0.6 |

Fig.15

| CELL No. | DEPRESSED AMOUNT (mm) | | UPPER △nd1 (nm) | LOWER △nd2 (nm) | △nd2-△nd1=△D (nm) | θ° |
|---|---|---|---|---|---|---|
| | UPPER | LOWER | | | | |
| D19 | 0.3 | 0.3 | 0.44 | 0.4 | -0.04 | -0.6 |
| D20 | 0.5 | 0.5 | 0.49 | 0.52 | 0.03 | 0.3 |
| D21 | 0.5 | 0.5 | 0.42 | 0.45 | 0.03 | -0.4 |
| D22 | 0.5 | 0.5 | 0.39 | 0.42 | 0.03 | -0.3 |
| D23 | 0.5 | 0.5 | 0.42 | 0.39 | -0.06 | -0.3 |
| D24 | 0.5 | 0.3 | 0.58 | 0.28 | -0.3 | -7.5 |
| D25 | 0.5 | 0.3 | 0.53 | 0.23 | -0.25 | -3.5 |
| D26 | 0.5 | 0.3 | 0.58 | 0.22 | -0.36 | -8 |

Fig.22

| TEMPERATURE OF LC CELL / RUBBING DIRECTION | 40°C | 45°C | 50°C | 55°C | 60°C |
|---|---|---|---|---|---|
| INTERSECTED DIRECTION | NOT OCCURRED FOR 500h | NOT OCCURRED FOR 500h | NOT OCCURRED FOR 500h | 100 h | 24h |
| PARALLEL DIRECTION | NOT OCCURRED FOR 500h | 500h | 100h | 24h | 15h |

LIQUID CRYSTAL CELL HAVING ALIGNMENT FILMS RUBBED WITH DIFFERING RUBBING DENSITIES

BACKGROUND OF THE INVENTION

1. Field of the Invention

The present invention relates to a liquid crystal cell using an antiferroelectric liquid crystal. Particularly, it relates to a liquid crystal cell having an electrode substrate with color filters.

2. Description of the Related Art

Recently, in a liquid crystal device, a liquid crystal cell has been widely used due to advantages of thin configuration, of light weight, and of low power consumption. In general, almost all liquid crystal cells are formed of TN (twisted nematic)-type liquid crystal cells which use nematic liquid crystals.

In this case, since the driving of the TN-type liquid cell depends on an anisotropic characteristic of a dielectric constant of the liquid crystal cell, the response speed (time) is very slow, and it is required to improve the response speed in the TN-type liquid cell.

On the other hand, another liquid crystal cell, which uses the liquid crystal cell having a chiral smectic C phase (below, SmC* phase) indicating a ferroelectric characteristic (this type of liquid crystal was found by Mr. Meyer et al.), has a high response speed and a good storage characteristic which could not be achieved by the above TN-type liquid cell. Accordingly, recently, research and development have been preformed to realize a ferroelectric liquid crystal cell having the above good characteristic.

However, when realizing both a good molecular alignment and a good storage characteristic, both of which are required of the ferroelectric liquid crystal, in an actual liquid crystal cell, many problems remain because the ferroelectric liquid crystal is easily damaged by a shock applied from the outside.

Furthermore, recently, an antiferroelectric phase ($SmC_A^*$ phase) which has three stable states at a low temperature of the $SmC_A^*$ phase was found by Chandani et al. Since this $SmC_A^*$ phase has a thermodynamically stable state in which dipoles (i.e., liquid crystal molecules) are arranged in anti-parallel for each adjacent liquid crystal layer, the $SmC_A^*$ phase has a function which produces an electric field-induced phase transfer between the antiferroelectric phase and the ferroelectric phase, which features have apparent threshold values and a double hysteresis characteristic for plus and minus supply voltages.

Accordingly, research and development have begun on the antiferroelectric liquid crystal cell, as a new display method utilizing this switching operation. The present invention aims to provide an improved liquid crystal cell using an antiferroelectric liquid crystal, and particularly, a liquid crystal cell having an electrode substrate with color filters.

SUMMARY OF THE INVENTION

The object of the present invention is to provide an improved liquid crystal cell using an antiferroelectric liquid crystal.

Another object of the present invention is to provide an improved liquid crystal cell having an electrode substrate with color filters in one side of the electrode substrate.

In accordance with a first aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; and the electrode substrate with color filters and the opposite electrode substrate being superimposed so as to face each other through the first alignment film, the antiferroelectric liquid crystal, and the second alignment film; wherein an alignment process of the first alignment film is performed based on a rubbing density larger than the rubbing density of the second alignment film so that an angle of layer rotation of the antiferroelectric liquid crystal is defined within a predetermined allowable angle range.

In accordance with a second aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; a plurality of walls each having line-shaped configuration provided on the first alignment film; and the electrode substrate with color filters and the opposite electrode substrate being superimposed so as to face each other through the first alignment film, the antiferroelectric liquid crystal, the plurality of walls each having line-shaped configuration, and the second alignment film; wherein an alignment process of the first alignment film is performed based on rubbing density larger than the rubbing density of the second alignment film so that an angle of layer rotation of the antiferroelectric liquid crystal is defined within a predetermined allowable angle range.

In accordance with a third aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; and the electrode substrate with color filters and the opposite electrode substrate being superimposed so as to face each other through the first alignment film, the antiferroelectric liquid crystal, and the second alignment film; wherein an alignment process of the first alignment film is performed based on rubbing density larger than the rubbing density of the second alignment film so that the difference between phase difference values of each refractive index after the alignment process of each alignment film is defined within a predetermined allowable range.

In accordance with a fourth aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; a plurality of walls each having line-shaped configuration provided on the first alignment film; and the electrode substrate with color filters and the opposite electrode substrate being superimposed so as to face each other through the first alignment film, the antiferroelectric liquid crystal, the plurality of walls each having line-shaped configuration, and the second alignment film; wherein an alignment process of the first alignment film is performed based on rubbing density larger than the rubbing density of the second alignment film so that the difference between phase difference values of each refractive index after the alignment process of each alignment film is defined within a predetermined allowable range.

In accordance with a fifth aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; and the electrode substrate with color filters and the opposite electrode substrate being superimposed so as to face each other through the first alignment film, the antiferroelectric liquid crystal, and the second alignment film; wherein an alignment process of the first alignment film is performed based on a rubbing density larger than the rubbing density of the second alignment film so that an angle of layer rotation of the antiferroelectric liquid crystal is defined within a predetermined allowable angle range, and the antiferroelectric liquid crystal is driven at temperature exceeding a predetermined temperature which is lower than a phase transfer point for phase transfer from $SmC_A^*$ phase to $SmC^*$ phase.

In accordance with a sixth aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; a plurality of walls each having line-shaped configuration provided on the first alignment film; and the electrode substrate with color filters and the opposite electrode substrate being superimposed so as to face each other through the first alignment film, the antiferroelectric liquid crystal, the plurality of walls each having line-shaped configuration, and the second alignment film; wherein an alignment process of the first alignment film is performed based on rubbing density larger than the rubbing density of the second alignment film so that an angle of layer rotation of the antiferroelectric liquid crystal is defined within a predetermined allowable angle range, and the antiferroelectric liquid crystal is driven at temperature exceeding a predetermined temperature which is lower than a phase transfer point for phase transfer from $SmC_A^*$ phase to $SmC^*$ phase.

In accordance with a seventh aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; and the electrode substrate with color filters and the opposite electrode substrate being superimposed so as to face each other through the first alignment film, the antiferroelectric liquid crystal, and the second alignment film; wherein an alignment process of the first alignment film is performed based on a rubbing density larger than the rubbing density of the second alignment film so that the difference between phase difference values of each refractive index after the alignment process of each alignment film is defined within a predetermined allowable range, and the antiferroelectric liquid crystal is driven at temperature exceeding a predetermined temperature which is lower than a phase transfer point for phase transfer from $SmC_A^*$ phase to $SmC^*$ phase.

In accordance with an eighth aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; a plurality of walls each having line-shaped configuration provided on the first alignment film; and the electrode substrate with color filters and the opposite electrode substrate being superimposed so as to face each other through the first alignment film, the antiferroelectric liquid crystal, the plurality of walls each having line-shaped configuration, and the second alignment film; wherein an alignment process of the first alignment film is performed based on a rubbing density larger than the rubbing density of the second alignment film so that the difference between phase difference values of each refractive index after the alignment process of each alignment film is defined within a predetermined allowable range, and the antiferroelectric liquid crystal is driven at temperature exceeding a predetermined temperature which is lower than a phase transfer point for phase transfer from $SmC_A^*$ phase to $SmC^*$ phase.

In accordance with a ninth aspect of the present invention, there is provided a liquid crystal cell including: an electrode substrate with color filters; an opposite electrode substrate; a first alignment film provided on the electrode substrate with color filters; a second alignment film provided on the opposite electrode substrate; an antiferroelectric liquid crystal provided between the first and second alignment films; a plurality of walls each having line-shaped configuration provided on any one of the first and second alignment films; and the electrode substrate with color filters and the opposite electrode substrate being superimposed so as to face each other through the first alignment film, the antiferroelectric liquid crystal, the plurality of walls each having line-shaped configuration, and the second alignment film; wherein an alignment process of any one of the first and second alignment films is performed based on a rubbing density larger than the rubbing density of the other alignment film so that an angle of layer rotation of the antiferroelectric liquid crystal is defined within a predetermined allowable angle range.

BRIEF DESCRIPTION OF THE DRAWINGS

In the drawings

FIGS. 2A and 2B are views for explaining the state of liquid crystal molecules in each layer before and after occurrence of layer rotation of the antiferroelectric liquid crystal in the liquid crystal cell which was rubbed;

FIG. 8 shows measured data for the Sample 1;

FIG. 9 shows measured data for the Sample 2;

FIG. 10 shows measured data for the Sample 3;

FIG. 13 shows measured data for occurrence of the layer rotation;

FIG. 14 shows measured data of the liquid crystal according to the second embodiment;

FIG. 15 shows measured data of the liquid crystal according to the second embodiment;

FIG. 22 is a view for explaining the relationship between temperature of the cell and the rubbing direction.

DESCRIPTION OF THE PREFERRED EMBODIMENTS

Before describing the preferred embodiments, a conventional art and its problem will be explained in detail with reference to FIGS. 1 to 4.

Figure 1:
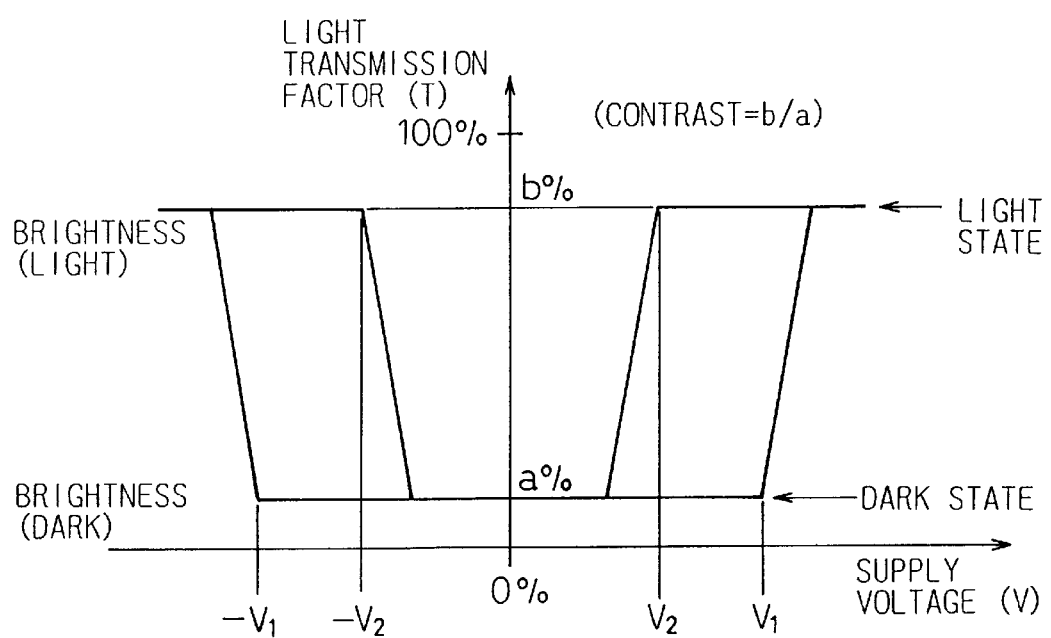
FIG. 1 is an explanatory view for explaining a double hysteresis characteristic between a light transmission factor and supply voltage in an antiferroelectric liquid crystal.

FIG. 1 is an explanatory view for explaining the double hysteresis characteristic of the antiferroelectric liquid crystal. In this graph, the ordinates denotes a light transmission factor T (%), and the abscissa denotes a supply voltage (V). As shown in the drawing, the double hysteresis characteristic has a relationship between an amount of light transmission (this is shown by the light transmission factor T (%) in FIG. 1) and the supply voltage (V).

The double hysteresis characteristic can be obtained as follows. That is, for example, two electrode substrates, which an alignment treatment was previously performed for the liquid crystal molecules, are superimposed one another through spacers. Further, the antiferroelectric liquid crystal is injected between two electrode substrates in order to obtain a liquid crystal cell. After the above processes, the liquid crystal cell is arranged on a polarization microscope having a photomultipler, and a voltage having triangle waveform is applied to the liquid crystal cell in which two polarization sheets are arranged in a cross-nicol state (i.e., a polarization directions intersect one another). As a result, it is possible to obtain the double hysteresis characteristic by measuring change of the amount of light transmission.

Further, the contrast displayed by the liquid crystal cell can be expressed by a ratio (b/a) between a light state of brightness and a dark state of brightness. In this case, the light state corresponds to "b"%, and the dark state corresponds to "a"%. These values can be obtained as follows. That is, the brightness 100% is determined by setting the polarization microscope so as to always transmit a constant amount of the transmission light, and the brightness 0% is determined at the time when the light is completely cut off.

In order to improve the contrast displayed by the liquid crystal cell, it is effective to reduce the dark state of brightness in accordance with the above definition of the contrast. The dark state of brightness is defined by the light transmission factor when no electric field is applied to the liquid crystal cell, and is dependent on a good or a poor state of the alignment of the antiferroelectric liquid crystal.

That is, in the antiferroelectric liquid crystal, the liquid crystal molecules are formed by layers which are called "smectic layers" different from the TN-type liquid crystal. For example, when injecting the antiferroelectric liquid crystal into the liquid crystal cell which was processed by one-axis alignment treatment using the rubbing process on the alignment film, an optical axis of the liquid crystal is directed to the rubbed direction.

FIGS. 2A and 2B are views for explaining the state of liquid crystal molecules in each layer before and after occurrence of layer rotation of the antiferroelectric liquid crystal in the liquid crystal cell in which the rubbing process was performed.

As shown in FIG. 2A, in the antiferroelectric liquid crystal, the smectic layer is usually formed perpendicular to the rubbing direction. Accordingly, when superimposing one of two polarization sheets having the cross-nicol state onto the optical axis of the antiferroelectric liquid crystal, it is possible to obtain the dark state of brightness.

As shown in FIG. 2B, however, when the liquid crystal cell is driven (i.e., the voltage is supplied to the cell) in the above state, the smectic layer is shifted from an initial state (i.e., the direction perpendicular to the rubbing direction), and is rotated within a plane parallel to both electrode substrates (i.e., the plane parallel to this drawing). That is, it is possible to observe "a phenomenon of layer rotation" (below, layer rotation) as shown in FIG. 2B.

When the layer rotation occurs, since the optical axis of the antiferroelectric liquid crystal is shifted from the optical axis of the polarization sheet, there is a problem in which the contrast becomes worse because the light leakage becomes large in the dark state.

Particularly, when the liquid crystal display device displays color, in accordance with a trend, the liquid crystal cell is formed by superimposing an electrode substrate with color filters and an electrode substrate without color filters. In this structure, however, there is a problem in which the large layer rotation occurs for a short time.

Recently, the layer rotation of the antiferroelectric liquid crystal was reported by Nakayama et al. (see An Abstract Document in 20th Liquid Crystal Forum, p 106, 1994). This document, however, merely teaches that, when an AC voltage having an asymmetric waveform is supplied to so-called "spacer edge cell", which has no alignment film and in which the antiferroelectric liquid crystal is horizontally aligned, the smectic layer is rotated in the vicinity of the edge. Accordingly, this report does not teach why the layer rotation occurs or how to prevent occurrence of the layer rotation.

Further, the antiferroelectric liquid crystal cell cannot resist external pressure (i.e., the antiferroelectric liquid crystal cell cannot resist pressure applied from an external environment). As a result, there is a problem in which the alignment of the liquid crystal is disturbed when a predetermined force is applied to a surface of the liquid crystal cell.

In order to solve this problem, there is a known art disclosed, for example, in the Japanese Examined Patent Publication (Kokoku) No. 7-99419. That is, a method for forming a wall having line-shaped configuration and made by a photosensitive resin between an upper electrode and lower electrode, is described in this document. However, this reference merely realizes a state of an initial alignment for a uniform mono-domain, and there is no consideration as to the wall configuration of the liquid crystal and the layer rotation.

On the other hand, there is another known art disclosed, for example, in the Japanese Unexamined Patent Publication (Kokai) No. 9-203901. According to this document, in a liquid crystal having the alignment film between both electrode substrates in order to stabilize the state of the alignment of the antiferroelectric liquid crystal, when an AC voltage having a symmetrical waveform is applied to the liquid crystal cell, the fact that the same layer rotation as mentioned above occurs in the liquid crystal molecules has been found out as described in this document.

Further, according to various experiments which were performed based on the above discovery, the fact that the layer rotation may be caused by an asymmetricity of the polarity of the falling (or trailing) response speed in the light transmission factor of the antiferroelectric liquid crystal, has been found out from the experiments.

Figure 3A:
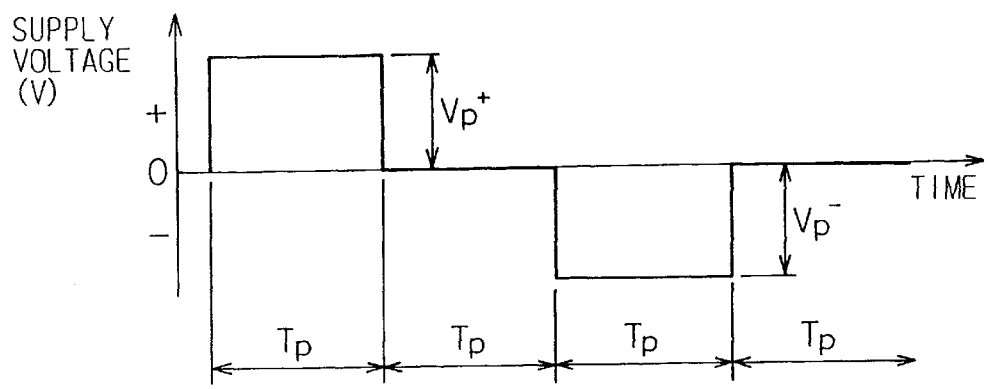
FIG. 3A is a signal timing chart indicating waveform of the supply voltage when the antiferroelectric liquid crystal was injected into the liquid crystal cell.
Figure 3B:
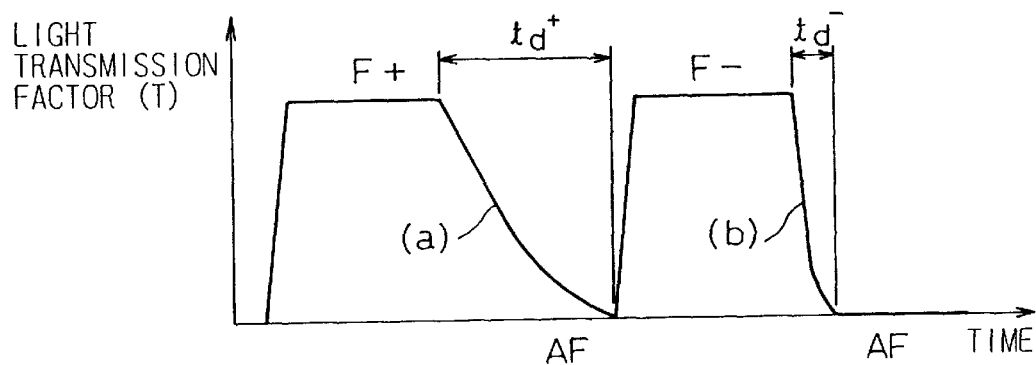
FIG. 3B is a signal timing chart indicating an optical response of the antiferroelectric liquid crystal when the supply voltage was applied to the liquid crystal cell.
Figure 4:
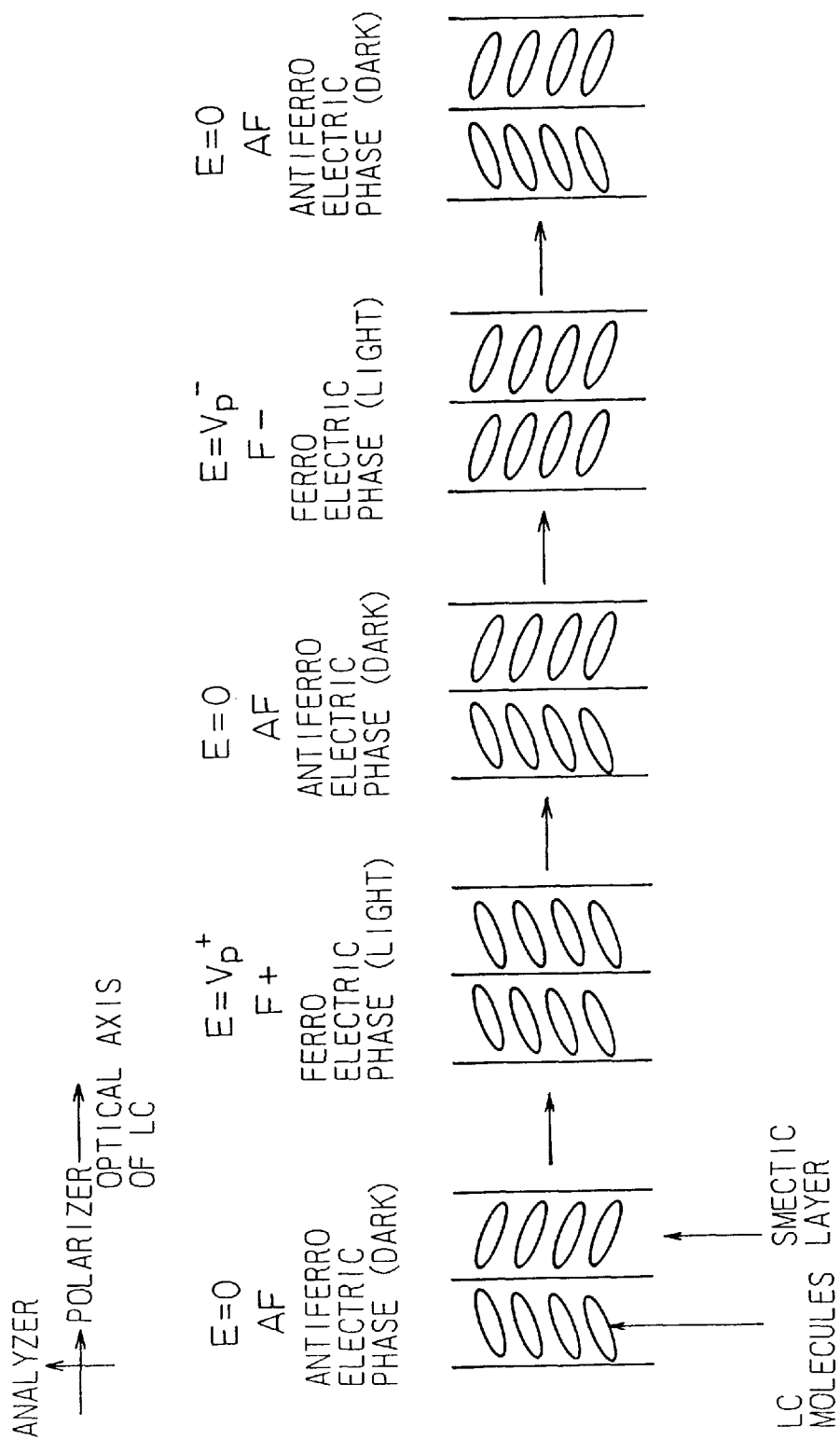
FIG. 4 is a view for explaining a change of direction of the liquid crystal molecules in the antiferroelectric liquid crystal when the supply voltage (i.e., AC voltage) was applied to the antiferroelectric liquid crystal.

That is, when an AC voltage having waveform shown in FIG. 3A is applied to the liquid crystal cell, an optical response-waveform of the antiferroelectric liquid crystal can be obtained as shown in FIG. 3B. Further, each alignment state of the antiferroelectric liquid crystal in which occurs a phase transfer induced by an electricfield (i.e., electricfield-induced phase transfer) is shown in FIG. 4.

FIG. 3A is a signal timing chart indicating a waveform of the supply voltage when the antiferroelectric liquid crystal was injected into the liquid crystal cell, and FIG. 3B is a signal timing chart indicating an optical response of the antiferroelectric liquid crystal when the supply voltage was applied to the liquid crystal cell. Further, FIG. 4 is a view for explaining a change of direction of the liquid crystal molecules in the antiferroelectric liquid crystal when the supply voltage (i.e., AC voltage) was applied to the antiferroelectric liquid crystal.

Regarding the asymmetricity of the polarity of the falling response speed in the light transmission factor of the antiferroelectric liquid crystal, this means that, as shown in FIG. 3B, the response time $t_d^+$ from the light state (F+: ferroelectric phase) to the dark state (AF: antiferroelectric phase) when the AC voltage was applied to the antiferroelectric liquid crystal in the positive electric field, is different from the response time $t_d^-$ from the light state (F−: ferroelectric phase) to the dark state (AF: antiferroelectric phase) when the AC voltage was applied to the antiferroelectric liquid crystal in the negative electric field.

Accordingly, if the response time $t_d^+$ can be equalized to or can be approximated to the response time $t_d^-$, it is possible to suppress the layer rotation of the antiferroelectric liquid crystal, and to prevent the reduction of the display contrast during operation of the liquid crystal cell.

That is, as explained above, the electricfield-induced phase transfer in three states AF, F+ and F− is a proper characteristic in the antiferroelectric liquid crystal. Accordingly, in the liquid crystal cell which is driven by the AC voltage, if the response time from a first stable state (ferroelectric phase) to a third stable state (antiferroelectric phase) can be equalized to or can be approximated to the response time from a second stable state (ferroelectric phase) to the third stable state (antiferroelectric phase), it is possible to suppress the layer rotation of the antiferroelectric liquid crystal.

Further, how to equalize or approximate both response speeds is briefly explained below as one example. That is, by equalizing or approximating the alignment action of the antiferroelectric liquid crystal in both electrode substrates, it is possible to realize the same alignment state between the states F+ and F−. For example, to make a kind of alignment film of the antiferroelectric liquid crystal uniform, to equalize the rubbing conditions when structures of an upper and lower substrates are the same one another, and to make uniform an anisotropy of an optical refractive index of both alignment films, are considered to realize the same alignment state.

The above facts can be realized for the liquid crystal cell used for a color liquid crystal display apparatus. However, since the liquid crystal cell used for the color liquid crystal display apparatus having a wall has a proper cell structure, it is necessary to consider the following point in order to improve the display contrast. That is, in a structure superimposed by three types of electrode substrates, i.e., an electrode substrate with a color filter which is proper to the liquid crystal cell used for the color liquid crystal display apparatus, an electrode substrate formed by the wall, and an electrode substrate having none of the above structures, it is impossible to obtain good display contrast if the rubbing conditions of the alignment films of both electrode substrates are the same.

In order to solve this problem, it is necessary to perform the rubbing process based on the process conditions of the alignment in which the rubbing density of the alignment film of the electrode substrate with color filters is larger than that of the alignment film of the electrode substrate without color filters.

Further, when employing the liquid crystal cell having the structure of the stripe-shaped wall based on the photosensitive resin, there are problems in which remains of a photoresist exist on the surface of the alignment film when forming the wall using the photoresist and developing solution, good alignment cannot be obtained because of damage by the developing solution on the surface of the alignment film, and the anisotropy of the optical refractive index is changed.

In order to solve these problems, it is required that the rubbing density of the alignment film of the electrode substrate forming the wall is larger than the rubbing density of the alignment film of the electrode substrate not forming the wall, or the rubbing process is performed after forming of the wall. In this case, when the wall having line-shaped configuration is formed by using a printing method, the rubbing process must be performed after forming of the wall since the alignment film becomes dirty when printing the wall.

Further, since the viscosity of the antiferroelectric liquid crystal decreases as the temperature rises, and since the asymmetricity of the polarity of the response speed becomes relatively large, layer rotation tends to occur. Accordingly, if the liquid crystal can be operated at a predetermined temperature (for example, minus 30° C., or minus 20° C.) which is lower than a point of the phase transfer Tc (this is a temperature in which the phase structure is changed from $SmC_A^*$ to $SMC^*$), the layer rotation can be suppressed. This was confirmed by the experiment.

Therefore, from the above viewpoints, the present invention aims to provide an improved liquid crystal cell with color filters which can suppress the layer rotation of the antiferroelectric liquid crystal.

The first embodiment according to the present invention will be explained in detail with reference to FIGS. 5 to 13.

Figure 5:
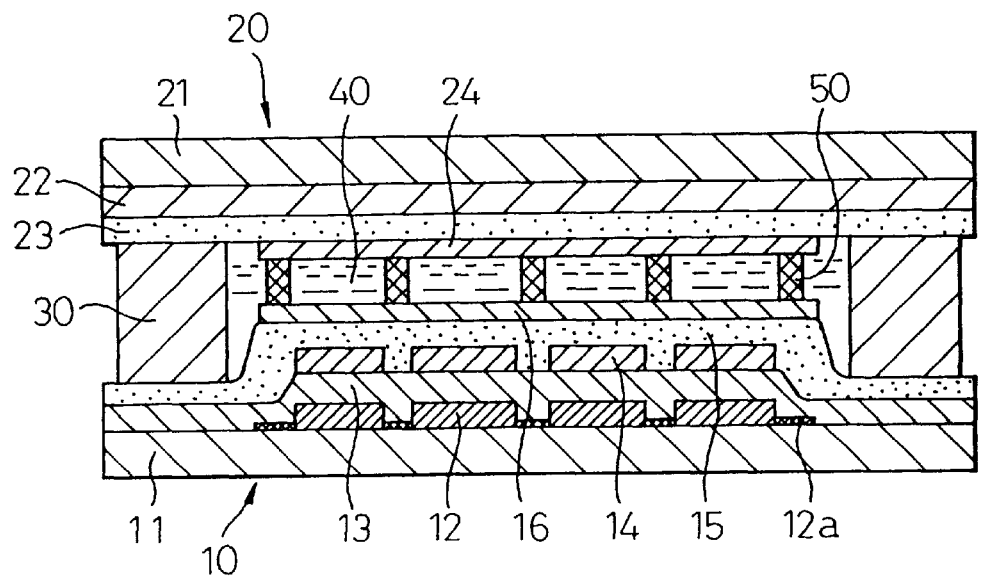
FIG. 5 shows one example of a liquid crystal cell used for a liquid crystal display apparatus with color filters according to the present invention.

FIG. 5 shows one example of a liquid crystal cell used for a liquid crystal display apparatus with color filters according to the present invention.

The liquid crystal cell basically includes an electrode substrate 10 with color filters and an opposite electrode substrate 20 without color filters. An antiferroelectric liquid crystal 40 is injected (enclosed) between electrode substrates 10 and 20 through an annular seal 30 and a plurality of line-shaped walls 50. In this case, reference number 50 shows a sectional view of each line-shaped wall. Accordingly, each wall has a line-shaped configuration.

The electrode substrate 10 is formed by a transparent substrate 11, a plurality of color filters having line-shaped configuration each provided on an inner surface of the transparent substrate 11 and each formed as a red filter, a green filter or a blue filter, a transparent protection film 13 provided on color filters 12 and the inner surface of the transparent substrate 11, a plurality of transparent electrodes 14 each having line-shaped configuration provided on an inner surface of the transparent protection film 13, a transparent isolation film 15 provided on the transparent electrodes 14, and a first alignment film 16 provided on an inner surface of the transparent insulation film 15.

On the other hand, the opposite electrode substrate 20 is formed by a transparent substrate 21, a plurality of transparent electrodes 22 each having line-shaped configuration provided on an inner surface of the transparent substrate 21, a transparent insulation film 23 provided on an inner surface of the transparent electrodes 22 and a second alignment film 24 provided on an inner surface of the transparent insulation film 23.

In this case, the transparent insulation film 23 and the second alignment film 24 are formed by the same material as the transparent insulation film 15 and the first alignment film 16. Further, each thickness of the transparent insulation film 23 and the second alignment film 24 is approximately the same as that of the transparent insulation film 15 and the first alignment film 16.

The line-shaped transparent electrodes 14 and 22 are orthogonally positioned on one another (i.e., intersect one another), and matrix-like pixels are formed. Further, a polarization plate is provided in a cross-nicol on each outer surface of the transparent electrodes 11 and 21.

A plurality of line-shaped walls 50 is formed on an inner surface of the first alignment film 16 (i.e., a side surface of the antiferroelectric liquid crystal 40) as follows.

Positive type photoresist solution which is one example of the photosensitive resin (Type AZ1350 made by SHIBRAY) was coated on the first alignment film 16 on order to form the resist film. After the above process, the stripe-like mask was provided on the resist film so as to cover the whole of the transparent electrodes 14, and this was exposed.

Next, the above structure was developed using a type MF 312 developing solution including tetramethylammonium hydroxide, an exposed portion on the resist film was eliminated, and this structure was heated in order to harden.

In this case, each wall 50 may be formed by negative type photoresist. Further, as a method of forming the wall 50, it is possible to form by printing a thermo-setting resin (for example, polyimide resins, epoxy resins, etc.), and ultraviolet ray-setting resin (for example, acrylic resins). In this case, since the processes for forming the wall are simplified, it is possible to reduce the manufacturing cost because of a reduction in the working time.

Further, the thickness of each wall 50 is 1.8 $\mu$m, and the first and second alignment films 16 and 24 are made by high polymer material (for example, high polyimide resins) and formed by the predetermined thickness (for example, 200 Å). Further, each wall 50 faces a corresponding black mask 12a through the alignment film 16, the insulation film 15 and the protection film 13. That is, as shown in FIG. 5, each wall 50 faces a corresponding black mask 12a between the transparent electrodes 14.

In this liquid crystal cell, since the color filters 12 and walls 50 are provided for only one electrode substrate (i.e., electrode substrate 10) in both electrode substrates 10 and 20, the thicknesses of the electrode substrates 10 and 20, and the shape and appearance of each surface of the first and second alignment films 16 and 24, are different one another.

Accordingly, if both electrode substrates 10 and 20 are processed by the same rubbing conditions (i.e., an amount (depth) depressed by a rubbing roller, a rotational speed of the rubbing roller, etc.), the display contrast becomes worse since an alignment control force of the liquid crystal molecule is different.

This is because, first, the alignment control force is different since an amount of electrostatic charge is different between electrode substrates 10 and 20 when the rubbing process is performed, and, second, the photoresist remains on the surface of the alignment film 16 when each wall 50 is formed. Accordingly, in order to obtain a suitable display contrast, it is necessary to provide different rubbing conditions for the electrode substrates 10 and 20 based on the rubbing conditions for the liquid crystal cell with color filters or without walls.

Before the rubbing process based on the above rubbing conditions, it is necessary to suppress a range of the layer rotation (this occurs regardless of color filters) of the antiferroelectric liquid crystal 40 to within a predetermined allowable range.

Figure 6:
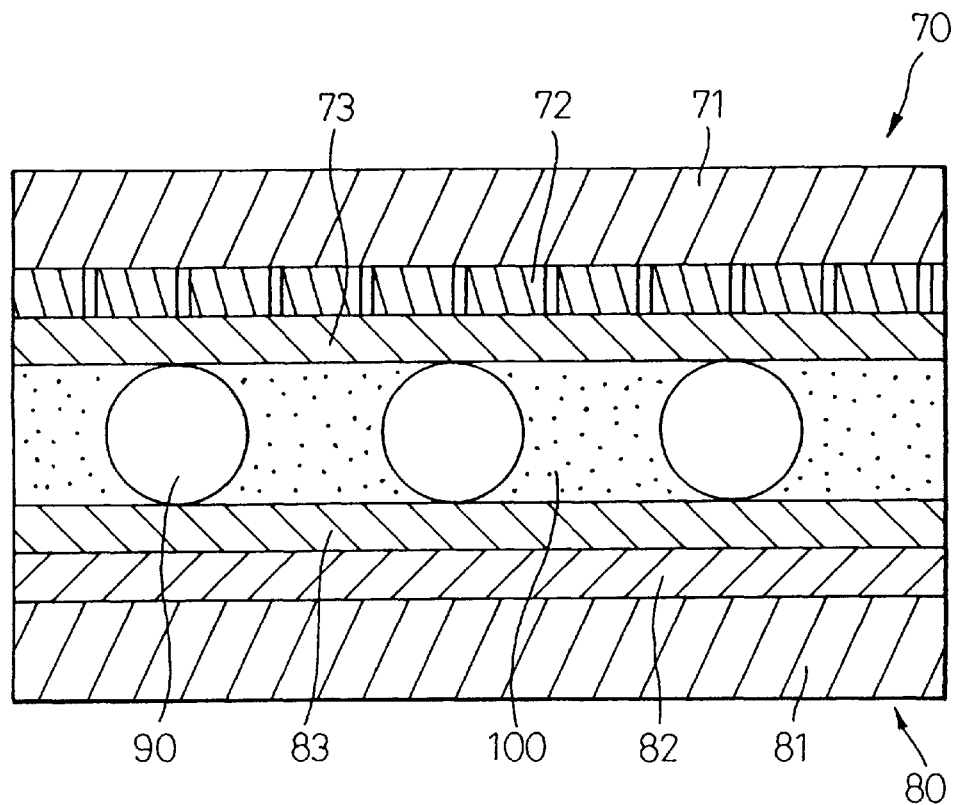
FIG. 6 is a schematic sectional view of the liquid crystal.

The following consideration was performed in order to clarify the range of the layer rotation with reference to FIG. 6.

FIG. 6 is a schematic sectional view of the liquid crystal. The many liquid crystal cells shown in FIG. 6 provide for the above consideration. In the liquid crystal cell, both electrode substrates 70 and 80 have no color filters, and are superimposed one another through spacers 90 and belt-like sealing member and adhesive fine grains (not shown). Further, the antiferroelectric liquid crystal 100 (this is the same as the above antiferroelectric liquid crystal 40) is injected between the electrode substrates 70 and 80 (i.e., between alignment films 73 and 83).

In this case, the electrode substrate 70 is formed by the glass substrate 71, a plurality of line-shaped transparent electrodes 72 (each consisting of an ITO (Indium Tin Oxide) provided on an inner surface of the glass substrate 71, the insulation film (not shown), and the alignment film 73 provided on an inner surface of the transparent electrode 72.

On the other hand, the electrode substrate 80 is formed by the glass substrate 81, a plurality of line-shaped transparent electrodes 82 (each consisting of an ITO (Indium Tin Oxide)

provided on an inner surface of the glass substrate 81, the insulation film (not shown), and the alignment film 83 provided on an inner surface of the transparent electrode 82.

The transparent electrode 82 is formed so as to constitute a plurality of pixels arranged in matrix with transparent electrode 72. Further, the thickness of the glass substrates 71 and 81 is 1.1 millimeters (mm), and the thickness of the layer of the antiferroelectric liquid crystal 100 is 1.8 µm.

The alignment films 73 and 83 face one another through the antiferroelectric liquid crystal 100 and are formed by a polymer (for example, polyimide) having the same thickness (for example, 200 Å). Further, the rubbing process is provided for each liquid crystal cell in each inner surface of the alignment films 73 and 83 in order to align the liquid crystal molecules of the antiferroelectric liquid crystal cell 100. In this case, the rubbing process was performed in accordance with the following conditions.

That is, the rubbing process was performed by using a known rubbing roller (not shown). The rubbing directions are anti-parallel each other between the alignment films 73 and 83. Further, the transfer direction of the rubbing roller is opposite to the rotational direction of the rubbing roller.

Further, Nylon was used for the rubbing cloth. The radius of the roller was 3.7 cm, the rotational speed of the roller was 100 r.p.m, the moving speed of a stage which moved the liquid crystal cell was 3.3 cm/sec, and the number of the rubbing processes was five. Further, the amount (depth) depressed by the rubbing roller (below, depressed amount) on the inner surface of the alignment film, was 0.3 mm to 0.5 mm.

The following are used as the antiferroelectric liquid crystal 100 by mixing the following materials, i.e., 4-(1-trifluoromethylheptoxycarbonyl)pheny-4'-octyloxybiphenyl-4-carboxylate (below, TFMHPOBC), 4-(1-trifluoromethylheptoxycarbonyl)pheny-4'-decylbiphenyl-4-carboxylate (below, TFMHPDBC), 4-(methylheptoxycarbonyl)pheny-4'-octyloxybiphenyl-4-carboxylate (below, MHPOBC), and a homologue of the above materials.

The mixture indicates the following phase sequence, i.e., crystal→SmC$_A$*→SmC*→SmA→isotropic liquid (−20° C.)(70° C.)(72° C.)(85° C.)

Where, the SmC$_A$* phase represents the antiferroelectric smectic liquid crystal phase, the SmC* phase represents the ferroelectric smectic liquid crystal phase, and the SmA phase represents a paraelectric smectic liquid crystal phase.

Figure 7A:
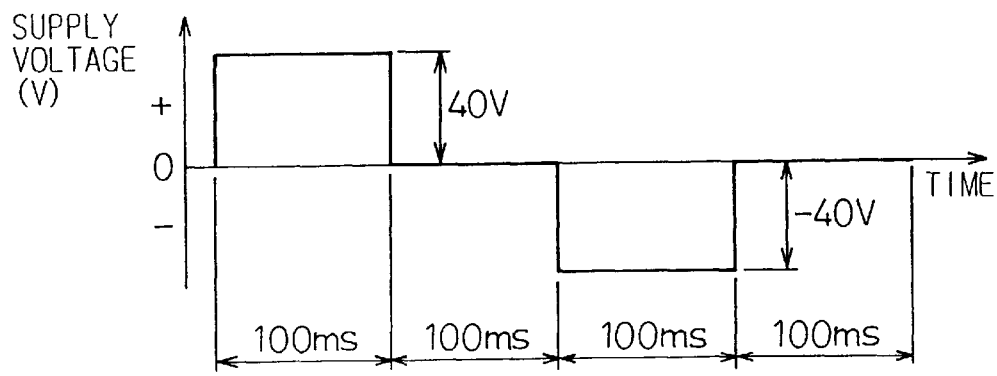
FIG. 7A is a timing chart of the supply voltage.
Figure 7B:
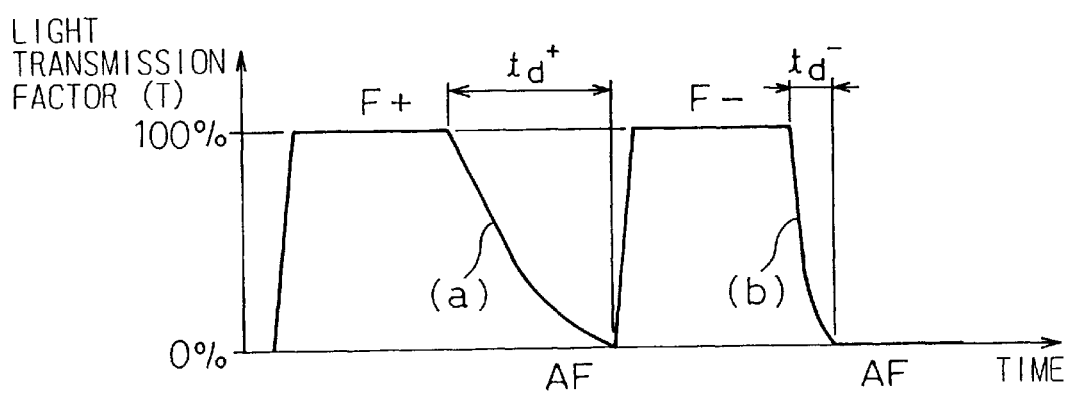
FIG. 7B is a graph for explaining change of the light transmission factor.

The following method was applied in order to measure the layer rotation of the liquid crystal cell which was prepared based on the above conditions with reference to FIGS. 6, 7A and 7B.

First, on a hot stage (not shown) in which the temperature can be controlled, the liquid crystal cell is set onto a stage of a polarization microscope so that the electrode substrate 70 is positioned in an upper side of the electrode substrate 80. At that time, the liquid crystal cell is arranged between two polarization sheets, which are arranged in the crossnicol, in the polarization microscope. Further, a photomultiplier which can detect the intensity of the transmitted light is mounted to the upper side of the polarization microscope and is connected to a cathode-ray oscilloscope in order to monitor the electro-optical characteristic of the antiferroelectric liquid crystal.

In the above monitoring process, the stage is rotated so as to give a dark viewfield in no electric field. That is, the optical axis of the antiferroelectric liquid crystal coincides with the optical axis of the polarization sheets so that the angle becomes 0° between the optical axes.

In the above conditions, after wiring was provided in such a way that the electrode substrate 70 becomes positive and the electrode substrate 80 becomes negative, the AC voltage (i.e., supply voltage) having the waveform shown in FIG. 7A, is applied between both electrode substrates 70 and 80, the response time ($t_d^+$) from the state F+ to the state AF, the response time ($t_d^-$) from the state F+ to the state AF, and the angle θ° of the layer rotation, are measured.

The response time $t_d$ ($t_d^+$ or $t_d^-$) is measured in such a way that, just after the AC voltage was applied, and it was confirmed that both intensities of the transmitted light at the state F (F+ and F−) in both polarities were equal to each other, the intensity at the state F is set to 100% and the intensity of the transmitted light at the state AF is set to 0%, then, the elapsed time to need to change the intensity of the transmitted light from 100% to 0%, is measured in both polarities.

In this case, when the response time becomes longer than 100 msec, the measurement is performed in such a way that, since the state is not completely returned from the state F to the state AF, a reset term of the waveform of the supply voltage is changed to the length for returning to the state AF, at only measurement of the response term.

Further, even if the difference ($t_d^+$ minus $t_d^-$) of the response time in one liquid crystal cell is the same as the difference ($t_d^+$ minus $t_d^-$) of the response time in the other liquid crystal cell, since the length of each response time ($t_d^+$ and $t_d^-$) in one cell is slightly different from that of the other cell, the asymmetricity of the polarity of the response time is also different. Accordingly, a degree of the asymmetricity of the polarity of the response time was standardized as follows.

That is, the difference $\Delta t_d$ ($=t_d^+-t_d^-$) between two response times ($t_d^+$ and $t_d^-$) and a means value $t_{dav}$ ($=(t_d^+ + t_d^-)/2$) of two response times were calculated, and the difference $\Delta t_d$ was divided by the means value $t_{dav}$ and, then, the calculated value $\Delta t_d/t_{dav}$ was used as the degree of the asymmetricity of the polarity of the response time.

Regarding the angle θ° of the layer rotation, in the non electric field after the voltage was applied to the liquid crystal cell and ten minutes had elapsed, the stage is rotated so as to obtain a dark viewfield. The layer rotational angle at that time is defined as the angle θ°. The reason to use of the angle θ° after ten minutes had elapsed, lies in that the increase of the layer rotational angle is saturated after about ten minutes in each liquid crystal cell.

Further, the direction of the layer rotational angle θ° of the antiferroelectric liquid crystal cell is defined in such a way that, when the liquid crystal cell is observed from the upper surface of the electrode substrate 70 (in this case, the electrode substrate 70 is positioned upper side), the direction of the layer rotational angle is positive when the optical axis of the antiferroelectric liquid cell is rotated counterclockwise from the angle θ°, and it is negative when the optical axis is rotated clockwise.

Various samples were prepared as explained in detail below.

Sample 1

FIG. 8 shows measured data for the sample 1. In the liquid crystal cells which were prepared in accordance with the above conditions, eight cells A11 to A18 were measured. That is, as shown in the drawing, the response time ($t_d^+$ and $t_d^-$), the difference ($\Delta t_d$) of the response time, the value ($\alpha t_d/t_{dav}$) and the layer rotational angle θ° were measured for each liquid crystal cell A11 to A18. In the rubbing conditions for these eight liquid crystal cells, the amount depressed by the rubbing roller was set to 0.3 mm for both electrode substrates 70 and 80.

Sample 2

FIG. 9 shows measured data for the sample 2. In the liquid crystal cells which were prepared in accordance with the above conditions, four cells B11 to B14 were measured. That is, as shown in the drawing, the response time ($t_d^+$ and $t_d^-$) the difference ($\Delta t_d$) of the response time, the value ($\Delta t_d/t_{dav}$) and the layer rotational angle θ° were measured for each liquid crystal cell B11 to B14. In the rubbing conditions for these four liquid crystal cells, the amount depressed by the rubbing roller was set to 0.3 mm for the upper substrate (electrode substrate 70), and set to 0.5 mm for the lower substrate (electrode substrate 80).

Sample 3

FIG. 10 shows measured data for the sample 3. In the liquid crystal cells which were prepared in accordance with the above conditions, four cells C11 to C14 were measured. That is, as shown in the drawing, the response time ($t_d^+$ and $t_d^-$), the difference ($\Delta t_d$) of the response time, the value ($\Delta t_d/t_{dav}$) and the layer rotational angle θ° were measured for each liquid crystal cell C11 to C14. In the rubbing conditions for these four liquid crystal cells, the amount depressed by the rubbing roller was set to 0.5 mm for the upper substrate (electrode substrate 70), and set to 0.3 mm for the lower substrate (electrode substrate 80).

Figure 11:
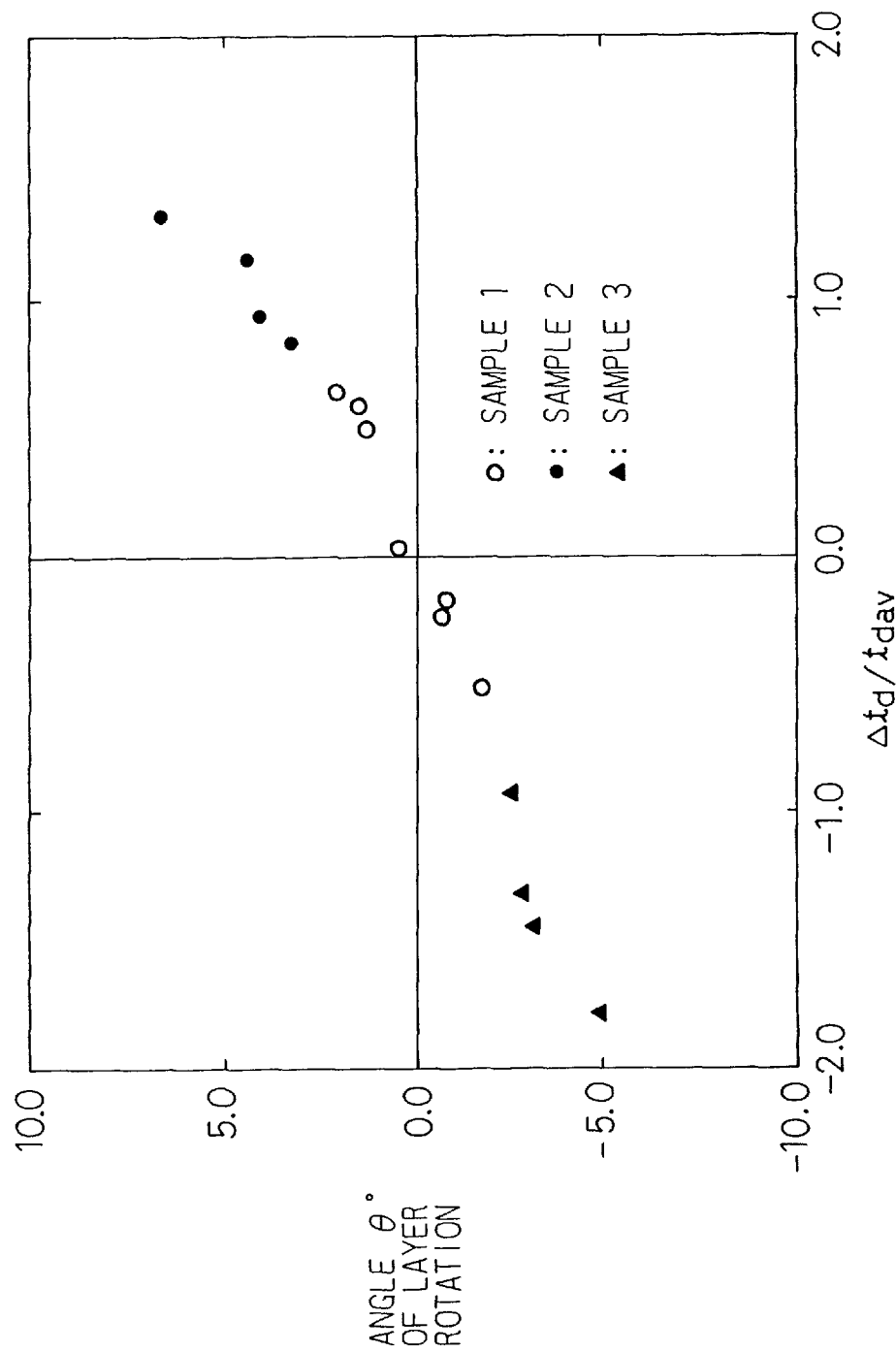
FIG. 11 is a graph for explaining the relationship between layer rotational angle θ° and the value ($\Delta t_d/t_{dav}$)

FIG. 11 is a graph for explaining the relationship between layer rotational angle θ° and the value ($\Delta t_d/t_{dav}$) In the drawing, the symbol "○" denotes the sample 1, the symbol "●" denotes the sample 2, and the symbol "▲" denotes the sample 3. According to the graph, it is obvious that, when two response time ($t_d^+$ and $t_d^-$) are close to each other, i.e., the difference ($\Delta t_d$) of two response time is smaller, the angle of the layer rotation also becomes smaller so that the occurrence of the layer rotation of the antiferroelectric liquid crystal cell is decreased.

In this case, the experiment was performed for the influence in which the layer rotation of the antiferroelectric liquid crystal acts to the display contrast. A result of above experiment is shown in FIG. 12.

Figure 12:
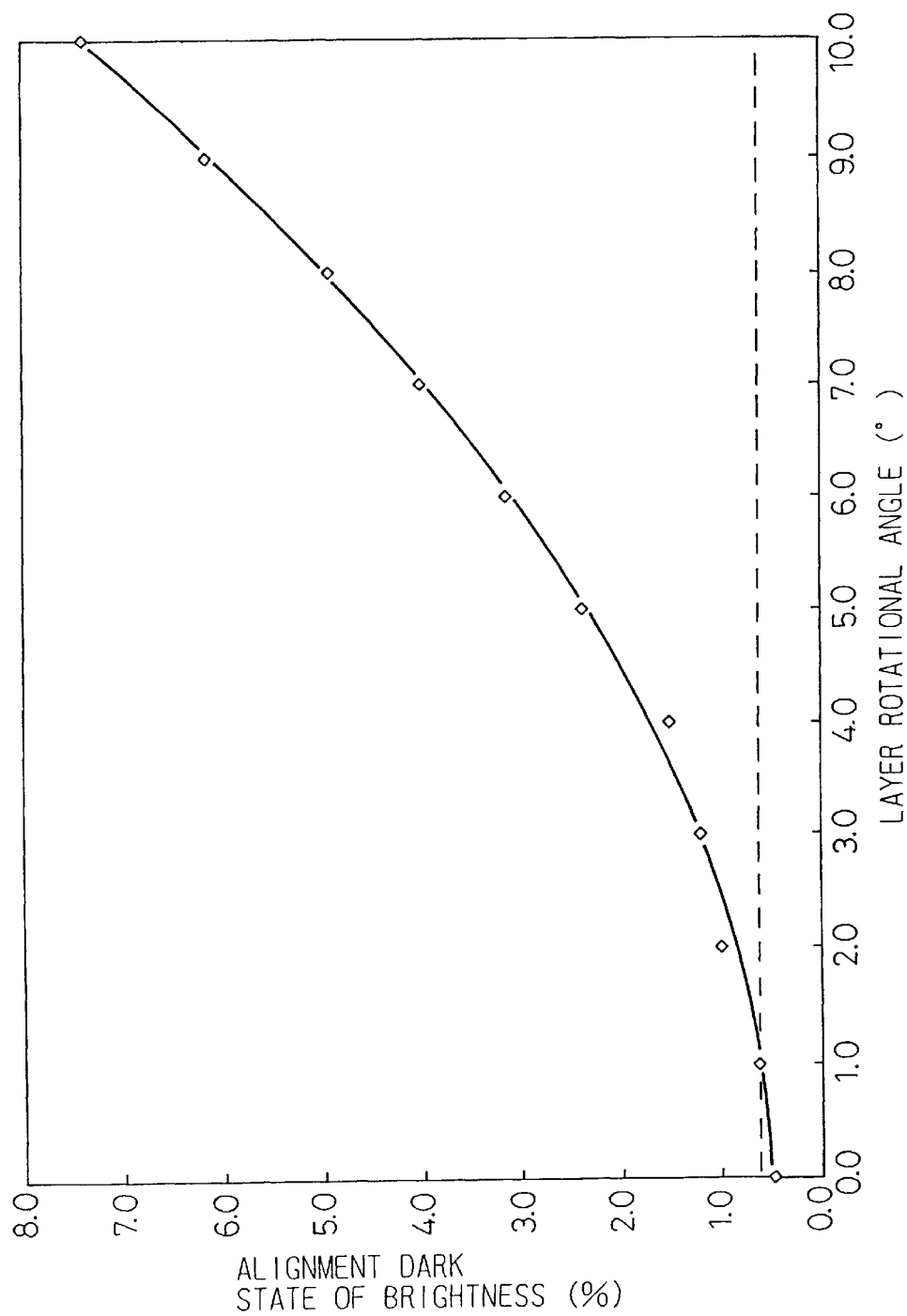
FIG. 12 is a graph for explaining the relationship between the layer rotational angle and the dark state of brightness of the alignment.

FIG. 12 is a graph for explaining the relationship between the layer rotational angle and the dark brightness of the alignment. This graph was obtained by providing the liquid crystal cell on a stage in which both polarization sheets of the polarization microscope are set to cross-nicol state and by measuring the relationship between the rotational angle of the stage (i.e., the rotational angle of the liquid crystal cell) and the change of an amount of the light.

According to the graph, it is obvious that the dark state of brightness of the alignment is increased with an increase in the rotational angle.

The display contrast is expressed by (light brightness/dark brightness). In the layer rotation of the antiferroelectric liquid crystal, since the change of the light state of brightness is small, the display contrast is decreased by 10% when the dark state of brightness is increased by 10%.

Accordingly, in this graph, when the layer rotational angle (i.e., the rotational angle of the stage) is 0°, the dark state of brightness is 0.5%. When the dark state of brightness is 0.55% (i.e., increased by 10% of 0.5%), and when the stage is rotated by 1% or more, it is obvious that the display contrast is decreased by 90% or less of the initial value. That is, in order to ensure good display contrast, it is preferable to set an allowable range of the layer rotational angle of the antiferroelectric liquid crystal within the range from –1° to +1°.

Further, as explained in the liquid crystal cell of the sample 1, when the depressed amount of the rubbing roller of the electrode substrate 70 is equal to that of the electrode substrate 80, the degree of the asymmetricity of the polarization of the response time td becomes small, and the layer rotational angle can be suppressed within the above allowable range except for the cells A11, A12, A14 and A17.

However, as explained in the liquid crystal cell of samples 2 and 3, when the depressed amount of the rubbing roller of the electrode substrate 70 is different from that of the electrode substrate 80, the degree of the asymmetricity of the polarization of the response time $t_d$ becomes large, and the layer rotational angle also becomes large.

As mentioned above, when both electrode substrates 70 and 80 have the same structure, and when the rubbing conditions (for example, the depressed amount of the rubbing roller) of both electrode substrates 70 and 80 are the same, the same alignment control force is applied to each alignment film of the electrode substrates 70 and 80 after the rubbing process. As a result, it is considered that the occurrence of the layer rotational angle can be suppressed.

Next, as mentioned above, by considering a proper cell structure of the liquid crystal cell, it is necessary to adjust the rubbing conditions to the first and second alignment films 16 and 24 of the electrode substrates 10 and 20 so as to suppress the layer rotation within the above allowable range.

Accordingly, a plurality of liquid crystal cells having the structure of FIG. 5, were prepared, and the rubbing conditions (the depressed amount, the rotational speed of the roller, the number of rubbing process, etc.) of the first and second alignment films 16 and 24 were changed and the occurrence of the layer rotation was checked. Where, the moving speed V of the stage of the rubbing apparatus, which mounts the electrode substrates 10 and 20, was 3.3 cm/sec, and the radius "r" of the roller was 3.7 cm. These values were fixed. Further, the rubbing density R of the first and second alignment films 16 and 24 were obtained by the following formula.

R=pNL (1+2πrn/60V)

Where, p is a rubbing pressure to the alignment film, N is the number of rubbing of the alignment film, L (cm) is a length of a contacting portion in which the alignment film contacts to the rubbing cloth (i.e., depressed amount), n (r.p.m) is the rotational speed of the roller (number of rotations per minute).

FIG. 13 shows measured data for the occurrence of the layer rotation. In the drawing, ERD denotes the electrode substrate, and OPP-ERD denotes the opposite electrode substrate. DEP-AMT denotes the depressed amount of the rubbing roller. ROT-SPD denotes the rotational speed of the rubbing roller. NUM-OF-RUB denotes the number of times of the rubbing operation. RES-TIME denotes the response time. RUB-DEN denotes the rubbing density.

First, when the rubbing density R of the first and second alignment films 16 and 24 obtained from the above formula is the same, the layer rotation becomes as follows. That is, as shown by the cells E16 and E17, when the rubbing density of the electrode substrate 20 is larger than that of the electrode substrate 10, the difference ΔD (nm) of the Δnd (physical meaning of this value will be explained in a second embodiment) becomes minus (−0.53 and −0.51). Accordingly, it is obvious that the layer of the antiferroelectric liquid crystal 40 is rotated in a opposite direction.

Second, when the rubbing density R of the first alignment film 16 is larger than that of the second alignment film 24, the layer rotation becomes as follows. That is, as shown by the cells E13, E14 and E15, the difference ΔD (nm) of the Δnd, the difference $\Delta t_d$ of the response time Δt, and the layer rotational angle θ° are smaller than those of the cells E11 and E12 (each has the same rubbing density) and the cells E16 and E17 (the rubbing density of the second alignment film 24 is larger than that of the first alignment film 16).

Accordingly, in the cell structure shown in FIG. 5, when the rubbing density of the first alignment film 16 of the electrode substrate 10 with color filters (i.e., the wall-formed electrode substrate) is larger than the rubbing density of the second alignment film 24 of the opposite electrode substrate 20 without color filters (i.e., not the wall-formed electrode substrate), it is possible to suppress the layer rotation of the antiferroelectric liquid crystal 40.

In this case, when the response time $t_d$ is measured and checked in an actual manufacturing process of the liquid crystal cell, it is possible to eliminate the liquid crystal cell having poor display contrast.

The second embodiment according to the present invention will be explained in detail with reference to FIGS. 14 to 17.

In the liquid crystal cell using the nematic liquid crystal, as general method of checking an abnormal alignment of the liquid crystal cell, the measurement of the optical phase difference on the inner surface of the alignment film after the rubbing process was reported by Mr. Nishino et al. (see An Abstract Document in 17-th Liquid Crystal Forum, p 33, 1991).

According to this report, an abnormal alignment control force for the alignment film is checked based on the abnormal value of the optical phase difference. The TN-type liquid crystal cell has a structure using the nematic liquid crystal instead of the antiferroelectric liquid crystal shown in FIG. 6. In this case, the cell gap is broader than that of the liquid crystal cell shown in FIG. 6.

The high polymer forming the alignment film of the TN-type liquid crystal cell is elongated along one axis direction by the rubbing process, and produces an anisotropy having an optical refractive index (below, refractive anisotropy) in the rubbing direction. Where, the direction and size of the refractive anisotropy is expressed by an optical phase difference value Δnd. In general, in an area in which the size of the refractive anisotropy is uniform in the rubbing direction, the liquid crystal molecules are uniformly aligned.

In the rubbing process, unevenness and dust on the electrode substrate occur on the inner surface of the alignment film to be rubbed, and lack of uniformity of the alignment control force also occurs in the rubbing process. It is considered that the lack of uniformity of the alignment control force occurred, from one cause or another, in the liquid crystal cells A11, A12, A14 and A17 which were explained in the Sample 1 of the first embodiment.

Accordingly, the degree of the asymmetricity of the polarization of the response time $t_d$ and the degree of occurrence of the layer rotation were observed by detecting the alignment control force from the viewpoint of the phase difference value Δnd of the alignment film, and not from the viewpoint of the value $\Delta t_d/t_{dav}$.

When measuring the phase difference value of the alignment film, a high sensitivity automatic birefringence measuring apparatus (model ADR-100XY, Oak Co., ltd.) was used. In this case, sixteen liquid crystal cells having the same structure as the cells shown in FIG. 6 were made. Further, before the electrode substrates of each liquid crystal cell were superimposed, the phase difference value of each alignment film of both electrode substrates was measured. In this case, a measuring spot was set to the diameter 1 mm.

In the measurement, the phase difference value was measured before and after the rubbing process, and it was possible to eliminate the influence of the substrate by subtracting the value before the rubbing from the value after the rubbing. As a result, it is possible to obtain the refractive anisotropy, which was induced by the rubbing, of the alignment film.

FIGS. 14 and 15 show measured data of the liquid crystal according to the second embodiment. In these drawings, D11 to D26 represent the cell numbers. The depressed amount by the roller (on the upper and lower electrode substrates), the phase difference of the upper electrode substrate Δnd1, the phase difference of the lower electrode substrate Δnd2, the difference ΔD (=Δnd2−Δnd1), and the angle θ° of the layer rotation, were measured for each liquid crystal cell D11 to D26.

That is, these drawings show the relationship between the difference ΔD of the phase difference of both alignment films at the superimposed area of each liquid crystal cell and the measured layer rotational angle θ°. The difference ΔD is given by the difference between the phase difference value Δnd2 of the alignment film of the lower substrate and the phase difference value Δnd1 of the alignment film of the upper substrate.

Figure 16:
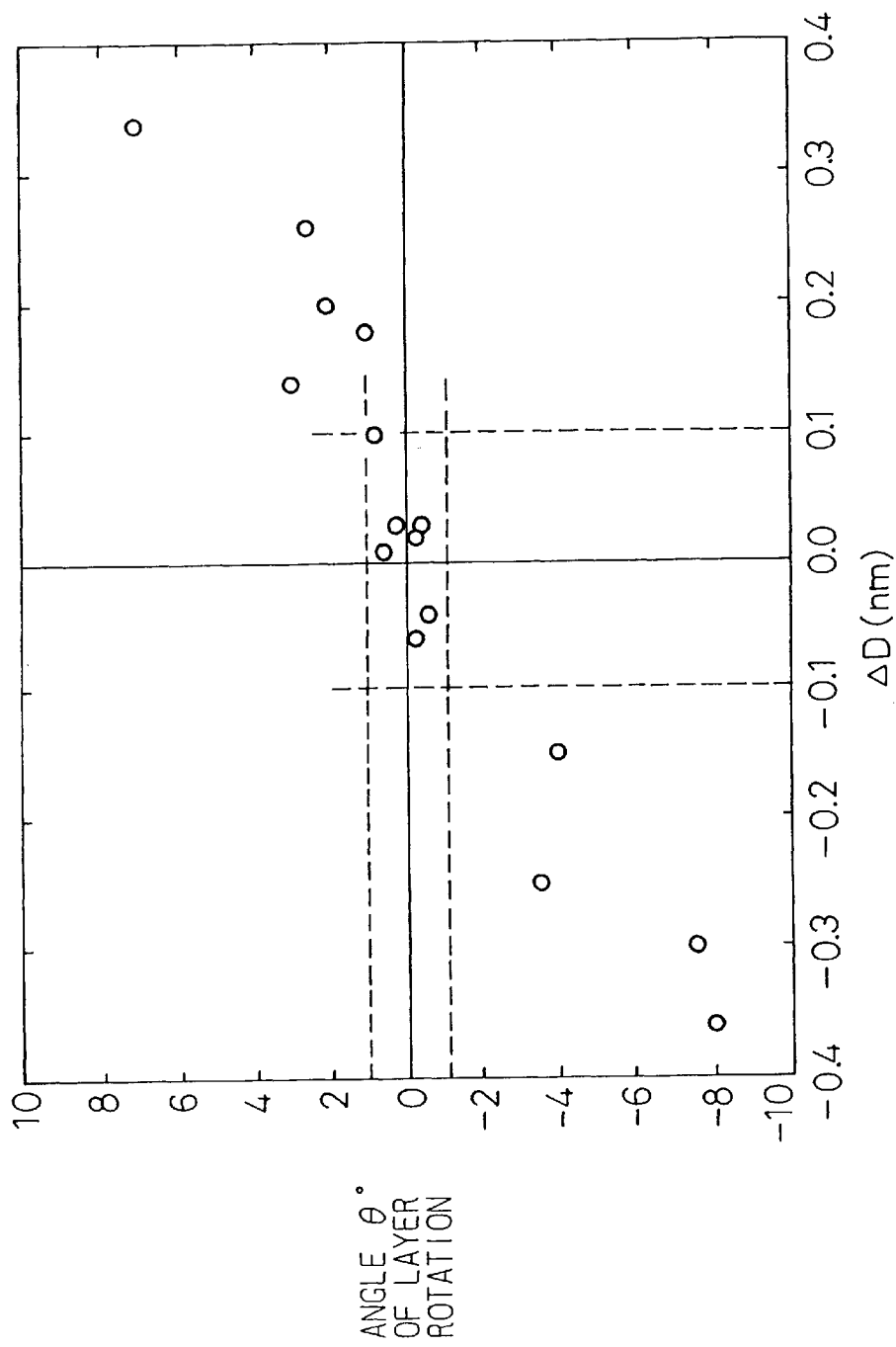
FIG. 16 is a graph for explaining the relationship between the difference ΔD of the phase difference and the layer rotational angle θ° which was prepared based on the result of FIGS. 14 and 15.

Further, FIG. 16 is a graph for explaining the relationship between the difference ΔD of the phase difference and the layer rotational angle θ° which were prepared based on the results of FIGS. 14 and 15. According to this graph, in order to set the layer rotational angle θ° within the range of the allowable angle, it is preferable to set the difference ΔD (nm) of the phase difference value Δnd of both alignment film to −0.1 (nm) over and +0.1 (nm) less (see D11, D18, and D19 to D23 in FIGS. 14 and 15). That is, by using the phase difference value Δnd of both alignment films corresponding to the difference ΔD of this range, it is possible to suppress the occurrence of the layer rotation of the antiferroelectric liquid crystal.

Figure 17:
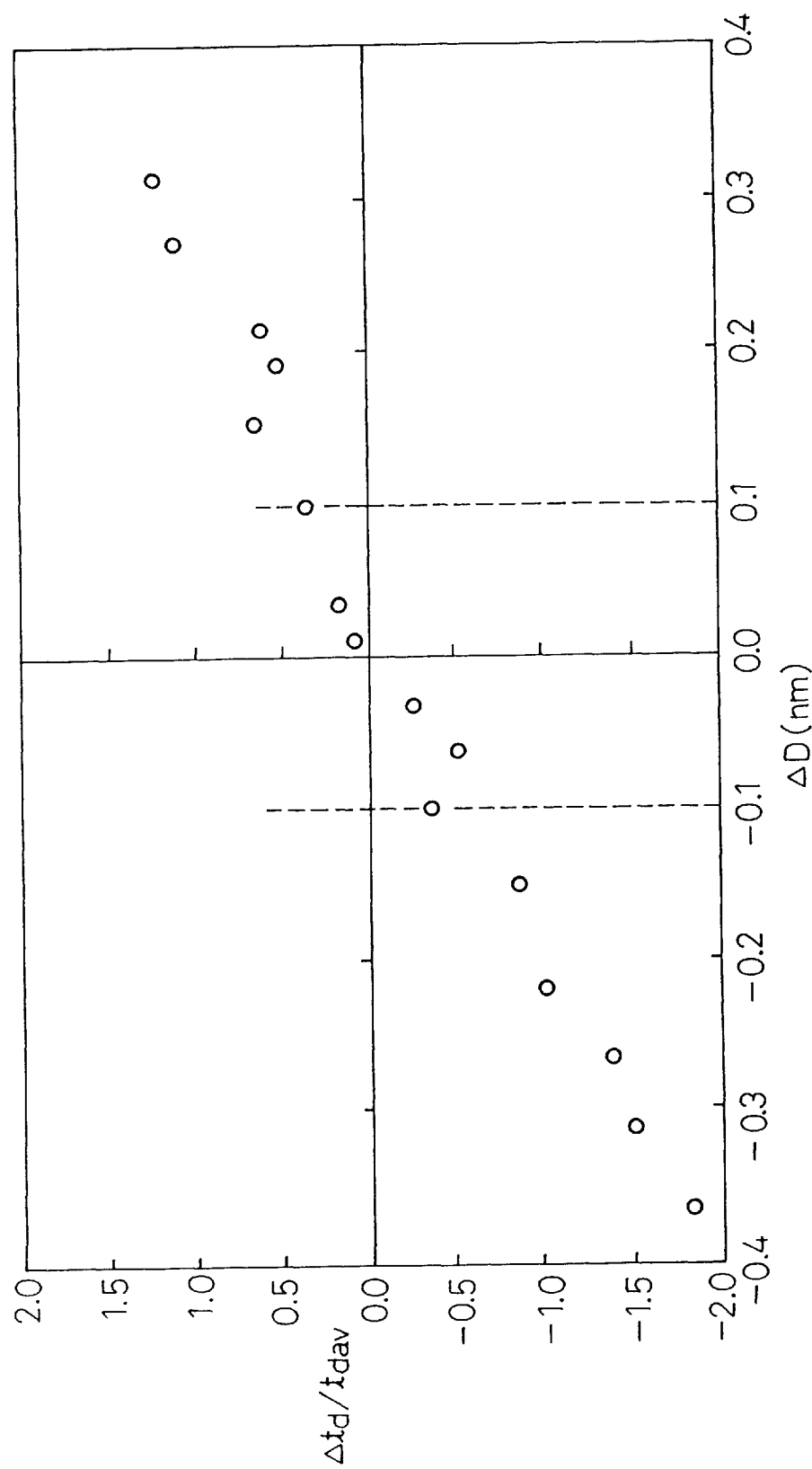
FIG. 17 is a view for explaining the relationship between the difference (ΔD) and the value ($\Delta t_d/t_{dav}$) of the first embodiment.

FIG. 17 is a view for explaining the relationship between the difference (ΔD) and the value ($\Delta t_d/t_{dav}$) of the first embodiment. According to this graph, it is obvious that the difference ΔD is proportional to the value $\Delta t_d/t_{dav}$. As a result of the above measurement, ideally, it is considered that there is no difference in precision between two methods, i.e., to suppress the layer rotation based on the viewpoint of the phase difference value of the alignment film in the second embodiment, and to suppress the layer rotation based on the viewpoint of the value $\Delta t_d/t_{dav}$ in the first embodiment.

However, in the rubbing conditions, although it is easy to set the depressed amount by the roller and the rotational speed of the roller, setting of other conditions is difficult. Accordingly, as mentioned in the Sample 1, when the suppression of the layer rotation of the antiferroelectric liquid crystal is performed based on the viewpoint of the relationship of the layer rotational angle θ° and the value $\Delta t_d/t_{dav}$, there is a dispersion in the resultant data. On the other hand, it is easy to measure the phase difference value Δnd of the alignment film. As a result, in the present stage, it is considered that it is more precise to perform suppression of the layer rotation based on the viewpoint of the phase difference value of the alignment film.

Although the above matters are realized regardless of "a cell with or without color filters" and "a cell with or without walls", when the structure of the electrode substrates 10 and 20 is different one another as shown by the cell of FIG. 5, as mentioned in the first embodiment, it is necessary to set the rubbing density in such a way that the rubbing density of the alignment film 16 of the electrode substrate 10 with color filters (i.e., wall forming electrode substrate) is larger than the rubbing density of the second alignment film 24 of the electrode substrate 20 without color filters (i.e., no wall forming electrode substrate). As a result, when the rubbing density is set as mentioned above, it is possible to suppress the occurrence of the layer rotation of the antiferroelectric liquid crystal 100.

The third embodiment according to the present invention will be explained in detail with reference to FIGS. 18 and 19.

Figure 18:
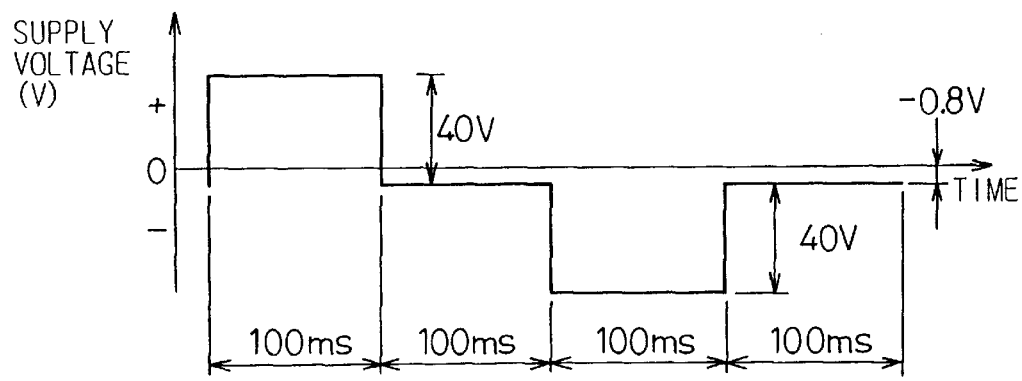
FIG. 18 is a timing chart of the supply voltage when superimposing the DC component (−0.8v) onto the AC voltage.

FIG. 18 is a timing chart of the supply voltage when superimposing the DC component (−0.8v) onto the AC voltage. In the first and second embodiments, based on the viewpoint of the value $\Delta t_d$ and the phase difference value $\Delta n d$, the explanations were given to the manufacturing of the liquid crystal cell for the color liquid crystal display apparatus which can suppress the layer rotation of the antiferroelectric liquid crystal.

In the third embodiment, the inventor found that, by superimposing a DC component onto an AC voltage (supply voltage) which is applied to the liquid crystal cell, an effective voltage which is applied to the antiferroelectric liquid crystal is increased or decreased so that the response time $t_d$ is also increased or decreased, and it is possible to symmetrize the polarity of the response time.

For example, in the liquid crystal cell in the Sample 2 mentioned in the first embodiment, the response time $t_d^+$ is 80 (ms) and the response time $t_d^-$ is 14 (ms). Accordingly, the response time $t_d$ is asymmetric of the polarity, and the layer rotational angle $\theta°$ is 7°.

Figure 19:
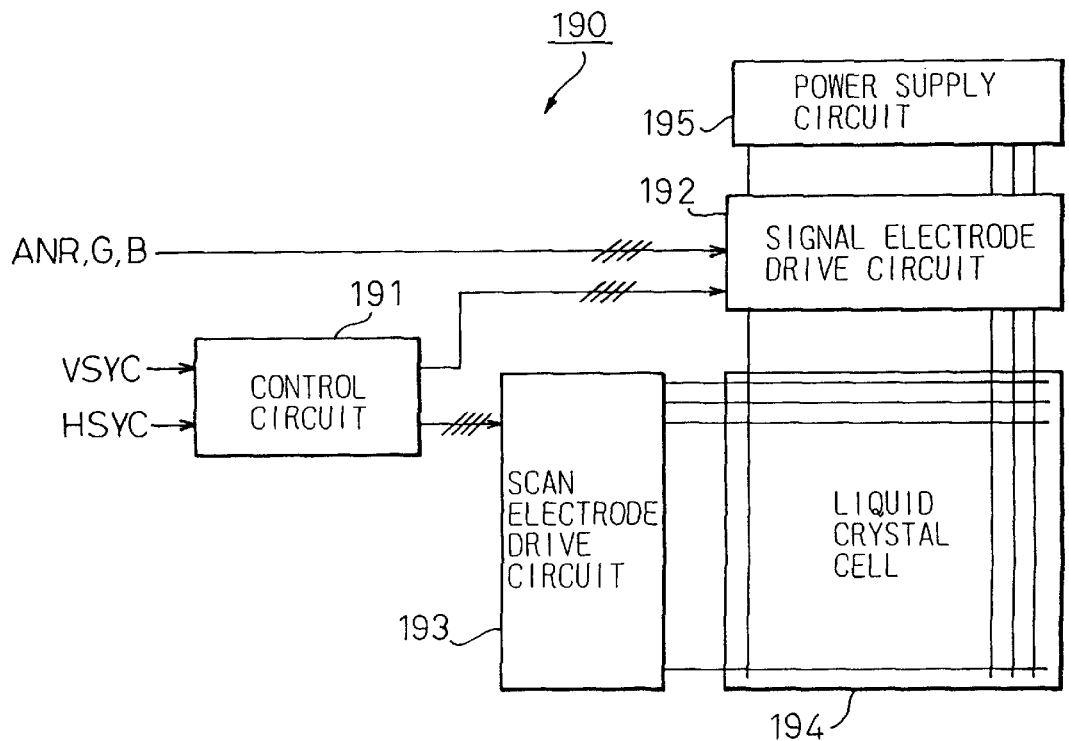
FIG. 19 is a schematic block diagram of a control apparatus connected to the liquid crystal cell of the first embodiment.

FIG. 19 is a schematic block diagram of a control apparatus connected to the liquid crystal cell of the first embodiment.

In the above liquid crystal cell, the voltage (see FIG. 18), in which the DC component (−0.8v) is superimposed onto the whole of the AC voltage, is applied from a scan electrode drive circuit 193 of the control apparatus 190 to the liquid crystal cell 194 shown in FIG. 19. Further, when the polarity is symmetrized so as to make the response time $(t_d^+)$=34 ms and the response time $(t_d^-)$=35 ms, it was possible to set the layer rotational angle $\theta°$ to approximately 0°.

In FIG. 19, the control apparatus 190 includes a control circuit 191, a signal electrode drive circuit 192, a scan electrode drive circuit 193, a liquid crystal cell 194 and a power supply circuit 195.

In the control apparatus 190, when a vertical synchronizing signal VSYC and a horizontal synchronizing signal HSYC are input to the control circuit 191, the control circuit 191 controls the waveform of the supply voltage to the liquid crystal cell 194 in the scan electrode drive circuit 193. Further, ANR, G and B signals are input to the signal electrode drive circuit 192. The control circuit 191 controls the supply voltage to the liquid crystal cell 194 based on the ANR, G and B signals in the signal electrode drive circuit 192.

The above mentioned matters are realized regardless of "a cell used for a color liquid crystal display or a cell not used for a color liquid crystal display". Accordingly, as mentioned for the liquid crystal cell shown in FIG. 6, when each rubbing condition of the alignment films of the liquid crystal cell is the same in the third embodiment, it is possible to suppress the occurrence of the layer rotation of the antiferroelectric liquid crystal cell in the third embodiment.

In this case, even if there are dispersions in each rubbing density R of the alignment films, based on control of the supply voltage by the control apparatus, it is possible to surely set the layer rotational angle of the antiferroelectric liquid crystal 100 within the allowable angle range.

The fourth embodiment according to the present invention will be explained in detail with reference to FIGS. 20 to 22.

Figure 20:
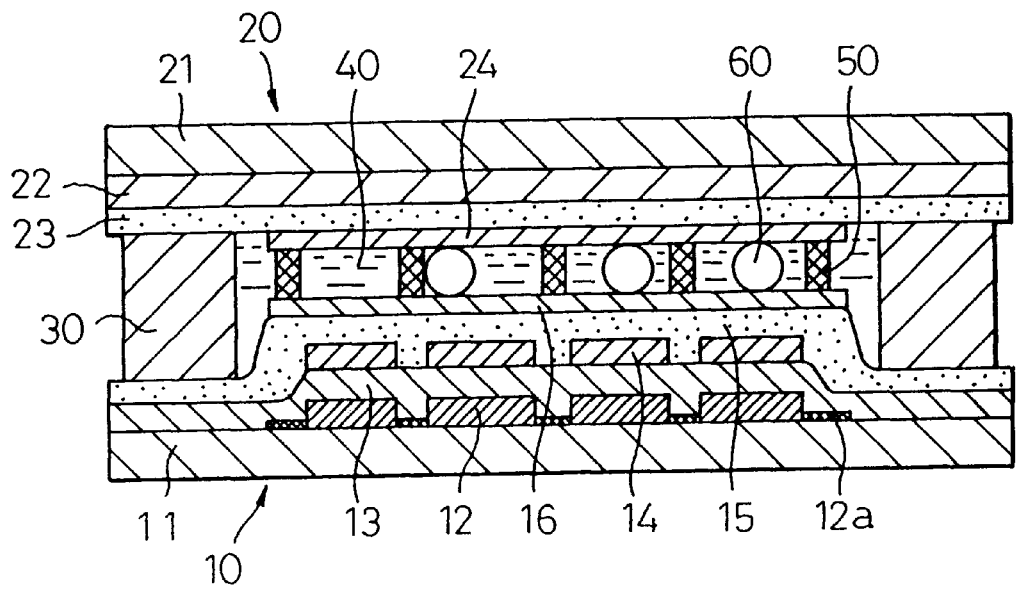
FIG. 20 is a sectional view of the liquid crystal cell according to the fourth embodiment of the present invention.

FIG. 20 is a sectional view of the liquid crystal cell according to the fourth embodiment of the present invention. In the fourth embodiment, the liquid crystal cell shown in FIG. 20 is employed instead of the liquid crystal cell shown in FIG. 5. As shown in the drawing, in the liquid crystal cell in the fourth embodiment, spacers 60 are newly added between the first and second alignment films 16 and 24 based on dispersion to the first and second alignment films 16 and 24. In this case, both electrode substrates 10 and 20 and each wall 50 in this embodiment have the same structure as that of the first embodiment.

Accordingly, in the fourth embodiment, as well as the first embodiment, the thickness and the inner surface shape of the electrode substrates 10 and 20 are different each other based on unevenness of the surface caused by presence or absence of the walls 50 and color filters.

As mentioned above, since the shape, etc., of the electrode substrates 10 and 20 are different, in the fourth embodiment as well as the first embodiment, it is necessary to suppress the rubbing conditions (rotational speed of the rubbing, the number of rubbings, etc.,) for the first and second alignment films of the electrode substrates 10 and 20 and to suppress the layer rotation of the antiferroelectric liquid crystal 40 to within the range of the allowable angle.

In order to realize the above, each of walls 50 was formed as the same structure as the first embodiment.

After each wall 50 was formed, the rubbing process is performed in each inner surface of the first and second alignment films 16 and 24 in order to align the liquid crystal molecules of the antiferroelectric liquid crystal 40 in accordance with the following conditions.

In this case, in the fourth embodiment, many spacers 60 are dispersed to the second alignment film of the electrode substrate 20, after dispersion, the electrode substrates 10 and 20 are superimposed as the same structure as the first embodiment in order to manufacture the cell.

When the spacers 60 are not provided, as shown in FIG. 5, the manufacturing process of the cell becomes difficult because it is necessary to adjust the hardness and superimposing conditions of the walls 50 in order to obtain a predetermined cell gap. On the other hand, in the fourth embodiment, it is easy to ensure the predetermined cell gap by dispersing (scattering) the spacers 60 between alignment films 16 and 24.

Next, the rubbing process in the fourth embodiment is explained in detail below.

The rubbing process was performed by using the known rubbing roller. The rubbing process is performed in parallel to the first and second alignment films 16 and 24, but the rubbing direction is opposite. In this case, the transferring direction of the rubbing roller is opposite to the rotational direction of the rubbing direction.

Nylon cloth was used as the rubbing cloth. The radius of the rubbing roller and the moving speed of the stage were set to 3.7 cm and 3.3 cm/sec. Further, the rotational speed of the rubbing roller was 1000 r.p.m, the number of the rubbings was 6 times to the first alignment film 16 and 3 times to the second alignment film 24. Further, the amount depressed at the inner surface of the alignment film by the rubbing roller is 0.35 mm for the electrode substrates 10 and 20.

The rubbing density R to the first and second alignment films 16 and 24 is determined in accordance with the above rubbing conditions based on the formula (1).

As a result, the rubbing density of the first alignment film 16 was 24.9γ, and the rubbing density of the second alignment film 24 was 12.4γ. As is obvious, the rubbing density of the first alignment film 16 is larger than that of the second alignment film 24.

That is, in order to suppress the layer rotation to within the allowable angle range, it is necessary that the rubbing density of the first alignment film 16 is larger than that of the second alignment film 24. In other words, regarding the phase difference value Δnd of the alignment film which occurs due to the rubbing process, it is difficult to produce in the second alignment film 16. From this reason, in order to set the difference ΔD of the phase difference value Δnd of the first and second alignment films 16 and 24 in the range of −0.1 nm and more and +0.1 nm and less, it is necessary to set the rubbing density in such a way that the rubbing density R of the first alignment film 16 is larger than that of the second alignment film 24.

Accordingly, as a method for increasing the rubbing density R, the rubbing pressure γ, the number of the rubbing N, the depressed amount L, the radius of the roller "r", and the rotational speed "n" of the roller are increased. In this case, the number of the rubbing N and the rotational speed "n" of the roller are easily performed on the alignment process. However, when the rotational speed "n" of the roller is extremely increased, the alignment films are damaged. Accordingly, it is better that the rotational speed "n" is 1000 r.p.m as an upper limit and the rubbing times N is increased.

Further, it is better that the rubbing process of the first alignment film 16 to form each wall 50 is performed after the walls 50 are formed. This is because, when the rubbing process is performed before each wall 50 is formed, a rubbing intensity (i.e., rubbing density) of the first alignment film 16 is decreased by receiving the damage caused by the developing solution when the walls 50 are formed.

Figure 21:
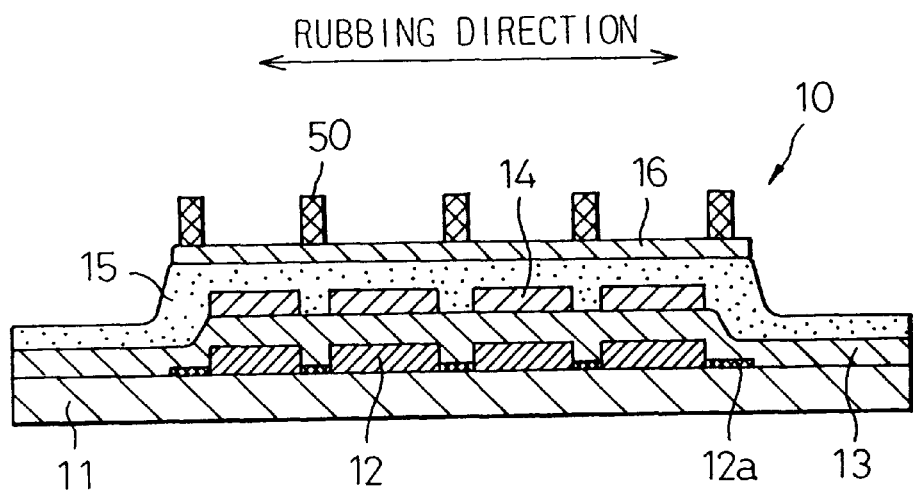
FIG. 21 is a view for explaining the rubbing direction of the fourth embodiment.

FIG. 21 is a view for explaining the rubbing direction of the fourth embodiment. As shown in FIG. 21, the rubbing is performed toward the direction intersecting the walls 50. This is because, according to the experiment, the layer rotation is much smaller in this direction than in the rubbing direction parallel to the walls 50. As the reason of the above, it is considered that the smectic layer of the smectic liquid crystal becomes parallel to the walls so that the side wall of each wall acts so as to suppress an energy which occurs in the direction of the layer rotation of the smectic layer. In this case, the rubbing density R is the same as in the case in which each wall 50 is not provided.

FIG. 22 is a view for explaining the relationship between temperature of the cell and the rubbing direction. Concretely, a plurality of liquid crystal cells having the same structure as that of FIG. 20 are prepared, and the occurrence time of the layer rotation of the antiferroelectric liquid crystal cell is checked by changing the rubbing direction to the alignment film and the temperature of the liquid crystal (LC) cell. The resultant data is shown in FIG. 22.

In this case, as the drive conditions of the liquid crystal cell, the liquid crystal cell is continuously driven at an interval of 1 sec in the conditions that the brightness is 20% and 80% in the relative light transmission rate. One rubbing direction is the direction intersected to the walls 50 (i.e., INTERSECTED DIRECTION in the drawing), and the other rubbing direction is the direction parallel to the walls 50 (i.e., PARALLEL DIRECTION).

According to FIG. 22, it is obvious that the layer rotation does not occur in the antiferroelectric liquid crystal when the rubbing is performed for the direction intersected to the walls 50, and the layer rotation does not occur in the antiferroelectric liquid crystal when the temperature of the liquid crystal cell is low. For example, at the temperature 40° C., the layer rotation did not occur in both directions (i.e., intersected to the wall and parallel to the walls 50) during 500 hours. On the other hand, at the temperature 60° C., the layer rotation occurred in both directions during 24 hours or 15 hours.

That is, it is obvious that it is possible to suppress the layer rotation of the antiferroelectric liquid crystal by driving the liquid crystal cell at the temperature of −20° C. which is lower than the phase transfer point Tc (70° C. in this embodiment), and by preferably driving the liquid crystal cell at the temperature of −30° C.

It is considered that the viscosity of the antiferroelectric liquid crystal is decreased when the temperature comes near the phase transfer point Tc, and the asymmetricity of the response time of the antiferroelectric liquid crystal becomes relatively large so that the layer rotation of the antiferroelectric liquid crystal easily occurs.

Where 500 hours is a target time generally used in the confirmation of the reliability of the liquid crystal cell.

In the fourth embodiment, the value of the DC voltage which was superimposed to the AC voltage, as mentioned in the third embodiment, may be selected in such a way that the response time ($t_d^+$) is equal to or close to the response time ($t_d^-$). For example, in the optical response waveform shown in FIG. 7B, the DC voltage may be superimposed to one of the waveforms (a and b) in such a way that the time required for the waveform (a) to fall from the F+ state to the AF state is equal to or close to the time required for the waveform (b) to fall from the F− state to the AF state.

Further, as mentioned above, although an explanation was given of the example which suppresses the occurrence of the layer rotation, by supplying a composite voltage in which the AC and DC voltages are superimposed to the liquid crystal cell in the third embodiment, the present invention is not limited to the above embodiment. That is, if the composite voltage is supplied to the liquid crystal cell in which the rubbing process is not performed, as mentioned in the first embodiment, it is possible to achieve the same effect as the third embodiment.

What is claimed is:

1. A liquid crystal cell comprising:
   an electrode substrate having color filters thereon;
   an opposite electrode substrate;
   a first alignment film provided on the electrode substrate;
   a second alignment film provided on the opposite electrode substrate;
   an antiferroelectric liquid crystal provided between the first and second alignment films; and
   the electrode substrate and the opposite electrode substrate being superimposed so as to face each other through the first alignment film, the antiferroelectric liquid crystal, and the second alignment film;
   wherein an alignment process of the first alignment film is performed based on a rubbing process having a rubbing density larger than the rubbing density of the second alignment film so that an angle of layer rotation of the antiferroelectric liquid crystal is defined within a predetermined allowable angle range.

2. A liquid crystal cell as claimed in claim 1, wherein the predetermined allowable angle range is defined from −1° to +1°.

3. A liquid crystal cell as claimed in claim 1, wherein the alignment process of the first and second alignment films is performed in such a way that a response time in the antiferroelectric liquid crystal from a first ferroelectric state to an antiferroelectric state is approximately the same as a response time from a second ferroelectric state to the antiferroelectric state.

4. A liquid crystal cell comprising:
   an electrode substrate having color filters thereon;
   an opposite electrode substrate;
   a first alignment film provided on the electrode substrate;
   a second alignment film provided on the opposite electrode substrate;
   an antiferroelectric liquid crystal provided between the first and second alignment films;
   a plurality of walls each having a line-shaped configuration provided on the first alignment film; and
   the electrode substrate and the opposite electrode substrate being superimposed so as to face each other through the first alignment film, the antiferroelectric liquid crystal, the plurality of walls, and the second alignment film;
   wherein an alignment process of the first alignment film is performed based on a rubbing process having a rubbing density larger than the rubbing density of the second alignment film so that an angle of layer rotation of the antiferroelectric liquid crystal is defined within a predetermined allowable angle range.

5. A liquid crystal cell as claimed in claim 4, wherein the predetermined allowable angle range is defined from −1° to +1°.

6. A liquid crystal cell as claimed in claim 4, wherein the alignment process of the first and second alignment films is performed in such a way that a response time in the antiferroelectric liquid crystal from a first ferroelectric state to an antiferroelectric state is approximately the same as a response time from a second ferroelectric state to the antiferroelectric state.

7. A liquid crystal cell as claimed in claim 4, wherein the alignment process of the first alignment film is performed after the walls are provided to the first alignment film.

8. A liquid crystal cell as claimed in claim 7, wherein the alignment process of the first and second alignment films is performed toward the direction intersecting the line-shaped walls.

9. A liquid crystal cell comprising:
   an electrode substrate having color filters thereon;
   an opposite electrode substrate;
   a first alignment film provided on the electrode substrate with color filters;
   a second alignment film provided on the opposite electrode substrate;
   an antiferroelectric liquid crystal provided between the first and second alignment films; and
   the electrode substrate and the opposite electrode substrate being superimposed so as to face each other through the first alignment film, the antiferroelectric liquid crystal, and the second alignment film;
   wherein an alignment process of the first alignment film is performed based on a rubbing process having a rubbing density larger than the rubbing density of the second alignment film so that the difference between phase difference values of refractive indexes of the first and second alignment films is defined within a predetermined allowable range.

10. A liquid crystal cell as claimed in claim 9, wherein the predetermined allowable range is defined from −0.1 nm to +0.1 nm.

11. A liquid crystal cell comprising:
    an electrode substrate having color filters thereon;
    an opposite electrode substrate;
    a first alignment film provided on the electrode substrate with color filters;
    a second alignment film provided on the opposite electrode substrate;
    an antiferroelectric liquid crystal provided between the first and second alignment films;
    a plurality of walls each having a line-shaped configuration provided on the first alignment film; and
    the electrode substrate and the opposite electrode substrate being superimposed so as to face each other through the first alignment film, the antiferroelectric liquid crystal, the plurality of walls, and the second alignment film;
    wherein an alignment process of the first alignment film is performed based on a rubbing process having rubbing density larger than the rubbing density of the second alignment film so that the difference between phase difference values of refractive indexes of the first and second alignment films is defined within a predetermined allowable range.

12. A liquid crystal cell as claimed in claim 11, wherein the predetermined allowable range is defined from −0.1 nm to +0.1 nm.

13. A liquid crystal cell as claimed in claim 1, 4, 9 or 11, wherein the rubbing process of the first alignment film is performed when at least one of a rotational speed of a rubbing roller and the number of times the rubbing process is performed is increased.

14. A liquid crystal cell as claimed in claim 13, wherein an upper limit value of the rotational speed of the rubbing roller is 1000 r.p.m.

15. A liquid crystal cell as claimed in claim 14, wherein the rotational speed of the rubbing roller is increased when the rubbing density of the first alignment film is set to a value larger than a value corresponding to the upper limit value.

16. A liquid crystal cell comprising:
    an electrode substrate having color filters thereon;
    an opposite electrode substrate;
    a first alignment film provided on the electrode substrate;
    a second alignment film provided on the opposite electrode substrate;
    an antiferroelectric liquid crystal provided between the first and second alignment films; and
    the electrode substrate and the opposite electrode substrate being superimposed so as to face each other through the first alignment film, the antiferroelectric liquid crystal, and the second alignment film;
    wherein an alignment process of the first alignment film is performed based on a rubbing process having a rubbing density larger than the rubbing density of the second alignment film so that an angle of layer rotation of the antiferroelectric liquid crystal is defined within a predetermined allowable angle range, and the antiferroelectric liquid crystal is driven at a temperature exceeding a predetermined temperature and lower than a phase transfer point for phase transfer from SMC$_A$* phase to SmC* phase.

17. A liquid crystal cell comprising:

an electrode substrate having color filters thereon;

an opposite electrode substrate;

a first alignment film provided on the electrode substrate;

a second alignment film provided on the opposite electrode substrate;

an antiferroelectric liquid crystal provided between the first and second alignment films;

a plurality of walls each having a line-shaped configuration provided on the first alignment film; and the electrode substrate and the opposite electrode substrate being superimposed so as to face each other through the first alignment film, the antiferroelectric liquid crystal, the plurality of walls, and the second alignment film;

wherein an alignment process of the first alignment film is performed based on a rubbing process having a rubbing density larger than the rubbing density of the second alignment film so that an angle of layer rotation of the antiferroelectric liquid crystal is defined with a predetermined allowable angle range, and the antiferroelectric liquid crystal is driven at the temperature exceeding a predetermined temperature and lower than a phase transfer point for phase transfer from SmC$_A$* phase to SmC* phase.

18. A liquid crystal cell comprising:

an electrode substrate having color filters thereon;

an opposite electrode substrate;

a first alignment film provided on the electrode substrate;

a second alignment film provided on the opposite electrode substrate;

an antiferroelectric liquid crystal provided between the first and second alignment films; and the electrode substrate and the opposite electrode substrate being superimposed so as to face each other through the first alignment film, the antiferroelectric liquid crystal and the second alignment film;

wherein an alignment process of the first alignment film is performed based on a rubbing process having a rubbing density larger than the rubbing density of the second alignment so that the difference between phase difference values of refractive indexes of the first and second alignment films is defined within a predetermined allowable range, and the antiferroelectric liquid crystal is driven at temperature exceeding a predetermined temperature and lower than a phase transfer point for phase transfer from SmC$_A$* phase to SmC* phase.

19. A liquid crystal cell comprising:

an electrode substrate having color filters thereon;

an opposite electrode substrate;

a first alignment film provided on the electrode substrate;

a second alignment film provided on the opposite electrode substrate;

an antiferroelectric liquid crystal provided between the first and second alignment films;

a plurality of walls each having a line-shaped configuration provided on the first alignment film; and the electrode substrate and the opposite electrode substrate being superimposed so as to face each other through the first alignment film, the antiferroelectric liquid crystal, the plurality of walls, and the second alignment film;

wherein an alignment process of the first alignment film is performed based on a rubbing process having a rubbing density larger than the rubbing density of the second alignment film so that the difference between phase difference values of refractive indexes of the first and second alignment films is defined with a predetermined allowable range, and the antiferroelectric liquid crystal is driven at temperature exceeding a predetermined temperature and lower than a phase transfer point for phase transfer from SmC$_A$* phase to SmC* phase.

20. A liquid crystal cell as claimed in claim 16, 17, 18, or 19, wherein the predetermined temperature is −20° C.

21. A liquid crystal cell as claimed in claim 16, 17, 18, or 19, wherein the predetermined temperature is −30° C.

22. A liquid crystal cell comprising:

an electrode substrate having color filters thereon;

an opposite electrode substrate;

a first alignment film provided on the electrode substrate;

a second alignment film provided on the opposite electrode substrate;

an antiferroelectric liquid crystal provided between the first and second alignment films;

a plurality of walls each having a line-shaped configuration provided on any of the first and second alignment films; and the electrode substrate and the opposite electrode substrate being superimposed so as to face each other through the first alignment film, the antiferroelectric liquid crystal, the plurality of walls, and the second alignment film;

wherein an alignment process of any one of the first and second alignment films is performed based on a rubbing process having a rubbing density larger than the rubbing density of the other alignment film so that an angle of layer rotation of the antiferroelectric liquid crystal is defined within a predetermined allowable angle range.

* * * * *